US010762695B1

(12) United States Patent
Halén

(10) Patent No.: US 10,762,695 B1
(45) Date of Patent: Sep. 1, 2020

(54) SYSTEMS AND METHODS FOR RAY-TRACED SHADOWS OF TRANSPARENT OBJECTS

(71) Applicant: Electronic Arts Inc., Redwood City, CA (US)

(72) Inventor: Karl Henrik Halén, Northridge, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 16/281,972

(22) Filed: Feb. 21, 2019

(51) Int. Cl.
| | |
|---|---|
| *G06T 15/60* | (2006.01) |
| *G06T 15/06* | (2011.01) |
| *G06T 7/90* | (2017.01) |
| *G06T 15/20* | (2011.01) |

(52) U.S. Cl.
CPC .............. *G06T 15/60* (2013.01); *G06T 7/90* (2017.01); *G06T 15/06* (2013.01); *G06T 15/20* (2013.01); *G06T 2210/21* (2013.01); *G06T 2210/62* (2013.01)

(58) Field of Classification Search
CPC ........... G06T 15/60; G06T 7/90; G06T 15/06; G06T 15/20; G06T 2210/21; G06T 2210/62; G06T 15/50
See application file for complete search history.

(56) References Cited

U.S. PATENT DOCUMENTS 5,488,700 A * 1/1996 Glassner .............. G06T 15/506
345/426
2005/0190194 A1 * 9/2005 Kraemer ................. G06T 15/04
345/582
2008/0074420 A1 * 3/2008 Kuesel .................... G06T 15/06
345/426

OTHER PUBLICATIONS

Andersson et al. "DirectX: Evolving Microsoft's Graphics Platform," Game Developers Conference, San Francisco, CA (Mar. 19-23, 2018).
Andersson et al. "Shiny Pixels and Beyond: Real-Time Raytracing at SEED," Game Developers Conference, San Francisco, CA (Mar. 19-23, 2018).
Barré-Brisebois et al. "PICA PICA and NVIDIA Turing," ACM SIGGRAPH 2018, (Aug. 12-16, 2018).
(Continued)

*Primary Examiner* — Ke Xiao
*Assistant Examiner* — Andrew Shin
(74) *Attorney, Agent, or Firm* — Leydig, Voit & Mayer, Ltd.

(57) ABSTRACT

Rendering shadows of transparent objects using ray tracing in real-time is disclosed. For each pixel in an image, a ray is launched towards the light source. If the ray intersects a transparent object, lighting information (e.g., color, brightness) is accumulated for the pixel. A new ray is launched from the point of intersection, either towards the light source or in a direction based on reflection/refraction from the surface. Ray tracing continues recursively, accumulating lighting information at each transparent object intersection. Ray tracing terminates when a ray intersects an opaque object, indicating a dark shadow. Ray tracing also terminates when a ray exits the scene without intersecting an object, where the accumulated lighting information is used to render a shadow for the pixel location. Soft shadows can be rendered using the disclosed technique by launching a plurality of rays in different directions based on a size of the light source.

20 Claims, 18 Drawing Sheets

(56) References Cited

OTHER PUBLICATIONS

Cook et al. "A Reflectance Model for Computer Graphics," ACM Transactions on Graphics (TOG), vol. 1, No. 1, pp. 7-24 (1982).
Cook et al. "Distributed ray tracing," ACM SIGGRAPH, Computer Graphics, vol. 18, No. 3 (Jul. 1984).
Dutre et al. "Advanced Global Illumination," Ch. 2.5.3, BRDF Examples, AK Peters/CRC Press, pp. 35-38 (2006).
Dutre et al. "Advanced Global Illumination," Ch. 3.5, Sampling Random Variables, AK Peters/CRC Press, pp. 63-67 (2006).
Dutre et al. "Advanced Global Illumination," Ch. 5.4.2, Single Light Source Illumination, AK Peters/CRC Press, pp. 117-120 (2006).
Heitz et al. "Combining Analytic Direct Illumination and Stochastic Shadows," ACM SIGGRAPH, Symposium on Interactive 3D Graphics and Games, Montreal, Canada (May 15-18, 2018).
Karis, Brian. "High-Quality Temporal Supersampling," ACM SIGGRAPH 2014, Talks, Vancouver, Canada (Aug. 10-14, 2014).
Lagarde, Sébastien. "Memo on Fresnel Equations," Wordpress (Apr. 29, 2013) (available at: https://seblagarde.wordpress.com/2013/04/29/memo-on-fresnel-equations/).
McGuire et al. "Phenomenological Transparency," IEEE Transactions on Visualization and Computer Graphics vol. 23, No. 5, pp. 1465-1478 (2017).
Schied et. al. "Spatiotemporal Variance-Guided Filtering: Real-Time Reconstruction for Path-Traced Global Illumination," Proceedings of High Performance Graphics 2017, Los Angeles, CA (Jul. 28, 2017).
Stachowiak, Tomasz. "Stochastic All the Things: Raytracing in Hybrid Real-Time Rendering," Digital Dragons 2018 Presentation, Krakow, Poland (May 21-22, 2018).

\* cited by examiner

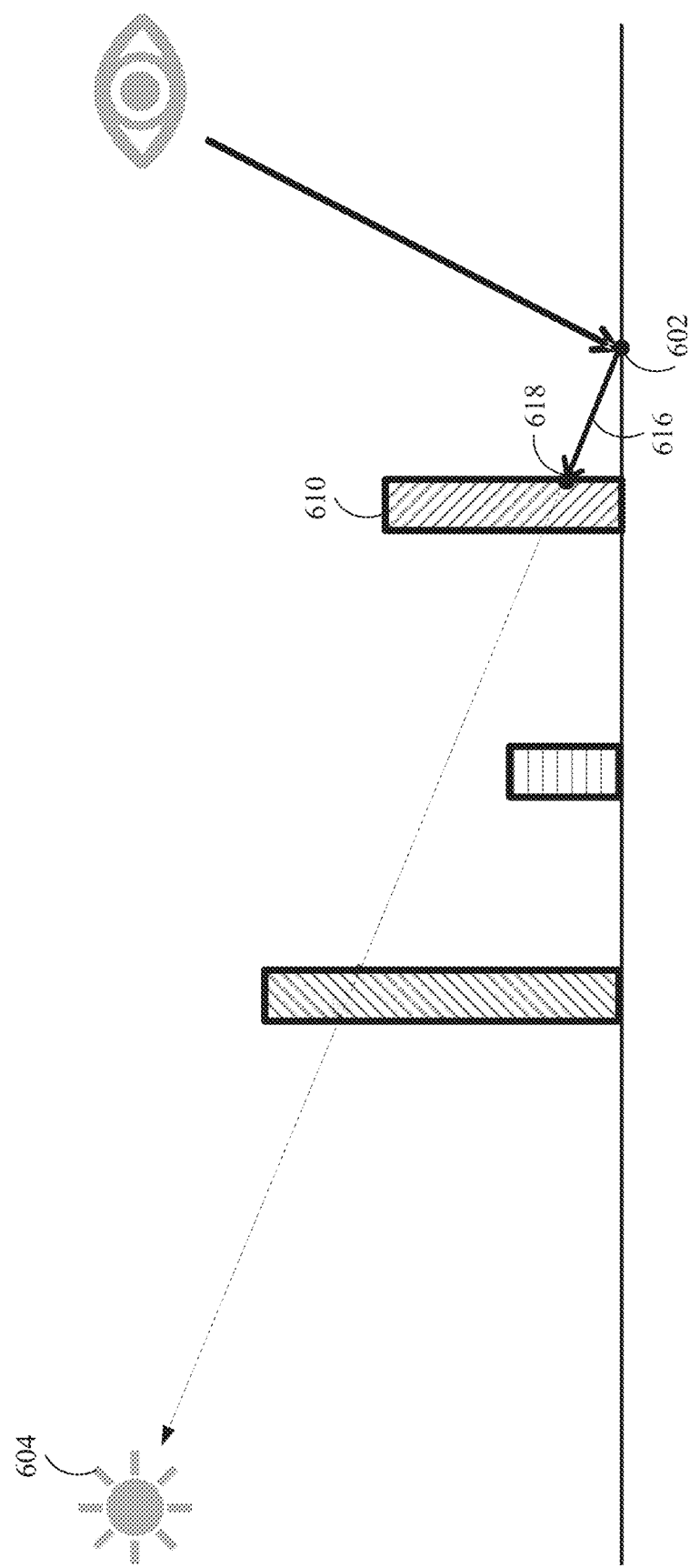

SYSTEMS AND METHODS FOR RAY-TRACED SHADOWS OF TRANSPARENT OBJECTS

FIELD

This disclosure generally relates to computer graphics and, more particularly, to systems and methods for ray-traced shadows of transparent objects.

BACKGROUND

Computer-generated images are often created by examining a geometric model of a view space and modeled objects in the view space. The geometric model of the objects can have arbitrary resolution, but typically each object is represented by a finite number of polygons, such as triangles, positioned in the view space and having a color, color pattern, or texture over their surface and/or an alpha value or values representing transparency of the polygon. An image is typically output (i.e., stored, displayed, transmitted, or otherwise processed) as a pixel array.

Some scenes may include objects that are transparent or partially transparent. Rendering transparent (and partially transparent) objects has proven to be difficult in real-time, particularly with rasterized rendering. In some conventional implementations to real-time rendering, all shadows in a scene are rendered as opaque shadows, which means that each object produces a dark shadow, regardless of the transparency of the object. Using opaque shadows, however, produces visually incorrect results for transparent objects.

In some instances, fully ray tracing a scene (i.e., tracing rays from the light source(s) into the scene) can solve the problems with rendering shadows for transparent objects discussed above. However, in some applications, such as video games, computational speed is a priority. In video games, frames are rendered very quickly, i.e., in real-time or near real-time, as a user interacts with a video game. As such, conventional ray tracing techniques (which can take hours or days to render a single frame) for rendering shadows for transparent objects are typically not suitable for video games.

As such, there remains a need in the art for a system and method for rendering shadows for transparent or translucent objects that overcome the drawbacks and limitations of existing approaches.

SUMMARY

Some embodiments of the disclosure provides a method, computer-readable storage medium, and device for rendering shadows in a scene. The method includes: selecting, by one or more processors, a pixel in an image of a scene, wherein the pixel corresponds to a point on a first object that is visible to a camera capturing the image of the scene; initializing, by the one or more processors, an occlusion value for the pixel; performing, by the one or more processors, ray tracing by launching a first ray in the direction of a light source from the point on the first object corresponding to the pixel; determining, by the one or more processors, that the first ray intersects a second object; generating, by the one or more processors, an updated occlusion value based on accumulating lighting information of the second object with the occlusion value; and storing, by the one or more processors, the updated occlusion value in a buffer at a location corresponding to the pixel, wherein the buffer includes shadow information that is applied to the image of the scene.

BRIEF DESCRIPTION OF THE DRAWINGS

FIGS. 6A-6F are block diagrams illustrating rendering of shadows through transparent objects using ray tracing, according to one embodiment.

DETAILED DESCRIPTION

Figure 1:
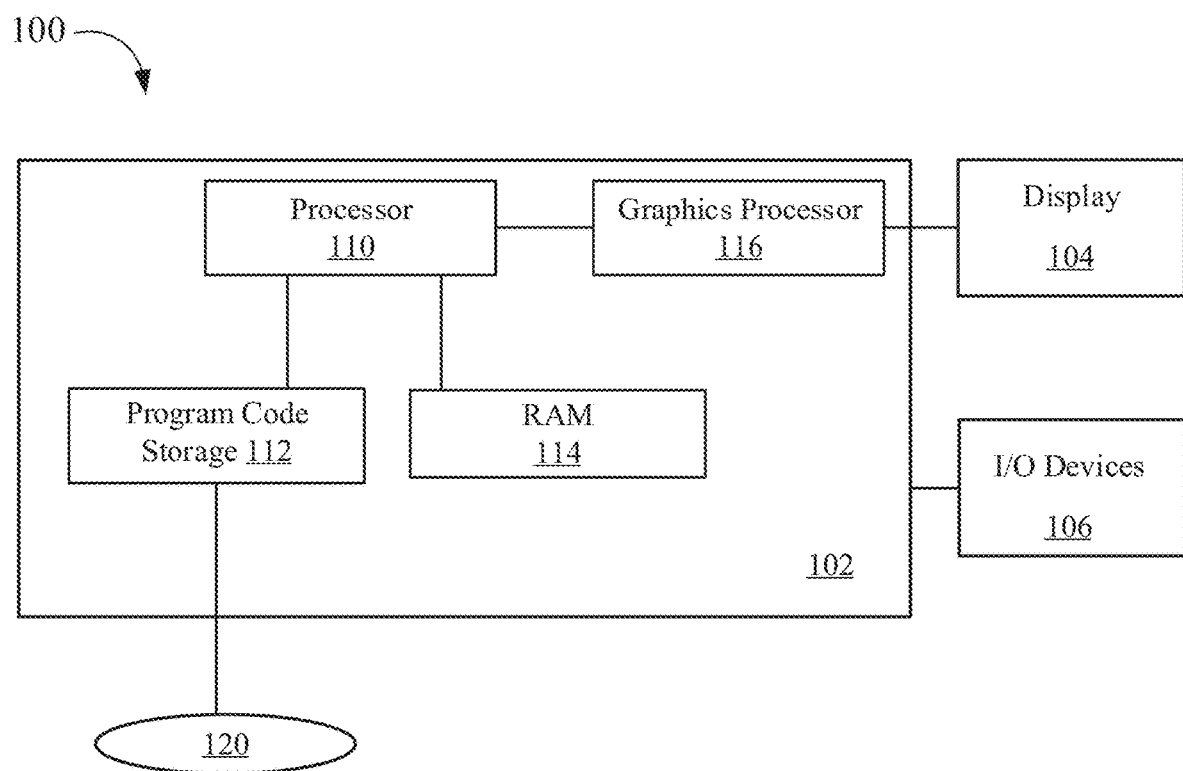
FIG. 1 is a block diagram of a computer system for rendering images, according to aspects of the present disclosure.

The following detailed description is exemplary in nature and is not intended to limit the disclosure or the application and uses of the disclosure. Furthermore, there is no intention to be bound by any expressed or implied theory presented in the preceding technical field, background, summary, brief description of the drawings, or the following detailed description.

Embodiments of the disclosure provide a system and method to generate shadows from transparent and partially transparent objects, including clear or colored transparent objects. In one embodiment, for each visible pixel in screen space (e.g., produced via rasterization), shadow information is determined by launching a ray from the surface of the object corresponding to the pixel. The ray is launched in the direction of a light source. In the event of an intersection of the ray with an object with transparency, embodiments of the disclosure evaluate the optical properties of the light-boundary interaction. Such optical properties can include the color of the medium and the transmission coefficient of the Fresnel equations of the medium. These optical properties are used to evaluate the effect on the transmission of light through the medium. These optical properties obtained from the light-boundary interaction are accumulated for the pixel. Using recursion, a new ray is then launched from the light-boundary intersection point towards the light source, accumulating further optical properties from another transparent object that may be intersected by the ray. Rays continue to be recursively launched in the direction of the light source from each light-boundary interaction point until certain criteria are met to end this recursion. For example, recursion ends when the ray intersects an opaque object, thus resulting in a dark/black shadow at the pixel being evaluated (i.e., no colored shadow). Intersecting an opaque object indicates that the pixel is occluded from the light source. Also, recursion ends when the ray exits the scene without intersecting any other objects. When the ray exits the scene, this means that there are either no objects between the pixel location and the light source, or one or more transparent objects between the pixel location and the light source, in which case the shadow at the pixel being evaluated is modulated by any accumulated optical properties from performing the ray tracing towards the light source.

Some embodiments of the disclosure may also reflect or refract light at each light-boundary intersection of a transparent object, based in part on the properties of the material of the intersection, as described in greater detail below. Using recursion, rays are launched and reflected/refracted through the scene until a termination condition is reached. Similar to an embodiment that does not implement reflection/refraction (i.e., an embodiment in which the rays are launched to continue towards the light source), recursion ends when the ray intersects an opaque object or exits the scene. In some embodiments, once a ray corresponding to the refracted light is determined to exit the scene, a divergence between the direction of the original ray launched towards the light source and the direction of the refracted ray that exited the scene is determined. The divergence amount can be used to approximate caustics in the shadow information for the pixel location.

In addition, some embodiments support soft shadows by randomizing the ray direction based on a size of the light source. Still further, some embodiments make use of spatial filtering and/or temporal filtering of the resulting color of the shadow to reduce variance and noise in the ray-traced transparent shadows.

Turning to the drawings, FIG. 1 is a block diagram of a computer system 100 for rendering images, according to aspects of the present disclosure. The computer system 100 may be, for example, used for rendering images of a video game. The computer system 100 is shown comprising a console 102 coupled to a display 104 and input/output (I/O) devices 106. Console 102 is shown comprising a processor 110, program code storage 112, temporary data storage 114, and a graphics processor 116. Console 102 may be a handheld video game device, a video game console (e.g., special purpose computing device) for operating video games, a general-purpose laptop or desktop computer, or other suitable computing system, such as a mobile phone or tablet computer. Although shown as one processor in FIG. 1, processor 110 may include one or more processors having one or more processing cores. Similarly, although shown as one processor in FIG. 1, graphics processor 116 may include one or more processors having one or more processing cores.

Program code storage 112 may be ROM (read only-memory), RAM (random access memory), DRAM (dynamic random access memory), SRAM (static random access memory), hard disk, other magnetic storage, optical storage, other storage or a combination or variation of these storage device types. In some embodiments, a portion of the program code is stored in ROM that is programmable (e.g., ROM, PROM (programmable read-only memory), EPROM (erasable programmable read-only memory), EEPROM (electrically erasable programmable read-only memory), etc.) and a portion of the program code is stored on removable media such as a disc 120 (e.g., CD-ROM, DVD-ROM, etc.), or may be stored on a cartridge, memory chip, or the like, or obtained over a network or other electronic channel as needed. In some implementations, program code can be found embodied in a non-transitory computer-readable storage medium.

Temporary data storage 114 is usable to store variables and other game and processor data. In some embodiments, temporary data storage 114 is RAM and stores data that is generated during play of a video game, and portions thereof may also be reserved for frame buffers, depth buffers, polygon lists, texture storage, and/or other data needed or usable for rendering images as part of a video game presentation.

In one embodiment, I/O devices 106 are devices a user interacts with to play a video game or otherwise interact with console 102. I/O devices 106 may include any device for interacting with console 102, including but not limited to a video game controller, joystick, keyboard, mouse, keypad, VR (virtual reality) headset or device, etc.

Display 104 can any type of display device, including a television, computer monitor, laptop screen, mobile device screen, tablet screen, etc. In some embodiments, I/O devices 106 and display 104 comprise a common device, e.g., a touchscreen device. Still further, in some embodiments, one or more of the I/O devices 106 and display 104 is integrated in the console 102.

In various embodiments, since a video game is likely to be such that the particular image sequence presented on the display 104 depends on results of game instruction processing, and those game instructions likely depend, in turn, on user inputs, the console 102 (and the processor 110 and graphics processor 116) are configured to quickly process inputs and render a responsive image sequence in real-time or near real-time.

Various other components may be included in console 102, but are omitted for clarity. An example includes a networking device configured to connect the console 102 to a network, such as the Internet.

Figure 2:
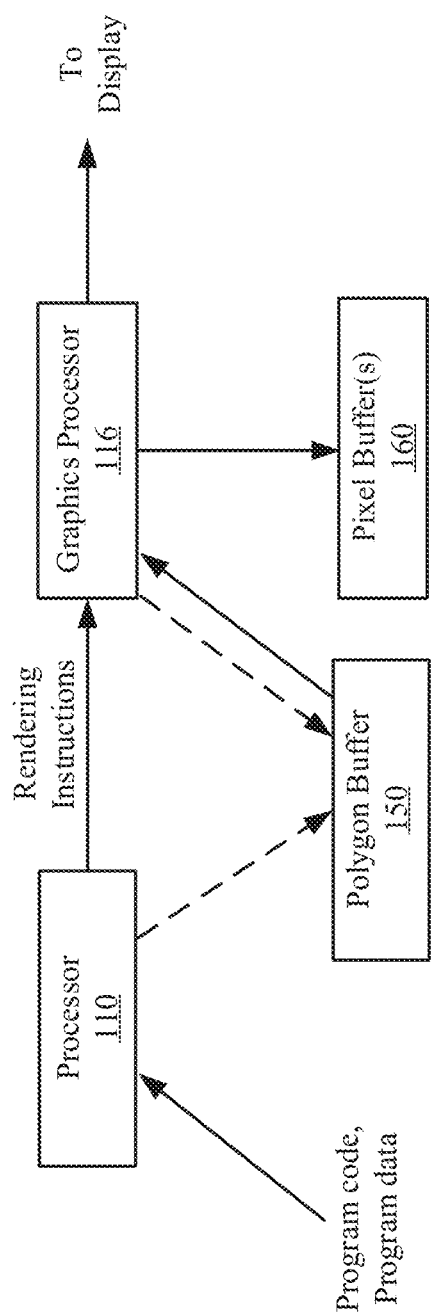
FIG. 2 is a block diagram illustrating processor and buffer interaction, according to one embodiment.

FIG. 2 is a block diagram illustrating processor and buffer interaction, according to one embodiment. As shown in FIG. 2, processor 110 executes program code and program data. In response to executing the program code, processor 110 outputs rendering instructions to graphics processor 116. Graphics processor 116, in turn, reads data from a polygon buffer 150 and interacts with pixel buffer(s) 160 to form an image sequence of one or more images that are output to a display. Alternatively, instead of sending rendering instructions to graphics processor 116 or in addition to sending rendering instructions to graphics processor 116, processor 110 may directly interact with polygon buffer 150. For example processor 110 could determine which objects are to appear in a view and provide polygon or other mathematical representations of those objects to polygon buffer 150 for subsequent processing by graphics processor 116.

In one example implementation, processor 110 issues high-level graphics commands to graphics processor 116. In some implementations, such high-level graphics commands might be those specified by the OpenGL specification, or those specified by a graphics processor manufacturer.

In one implementation of an image rendering process, graphics processor 116 reads polygon data from polygon buffer 150 for a polygon, processes that polygon and updates pixel buffer(s) 160 accordingly, then moves on to the next polygon until all the polygons are processed, or at least all of the polygons needing to be processed and/or in view are processed. As such, a renderer processes a stream of polygons, even though the polygons may be read in place and be a finite set, where the number of polygons is known or determinable. For memory efficiency and speed, it may be preferable in some implementations that polygons be processed as a stream (as opposed to random access, or other ordering), so that fast, expensive memory used for polygons being processed is not required for all polygons comprising an image.

In some embodiments, processor 110 may load polygon buffer 150 with polygon data in a sort order (if one is possible, which might not be the case where there are overlapping polygons), but more typically polygons are stored in polygon buffer 150 in an unsorted order. It should be understood that although these examples use polygons as the image elements being processed, the apparatus and methods described herein can also be used on image elements other than polygons.

Figure 3:
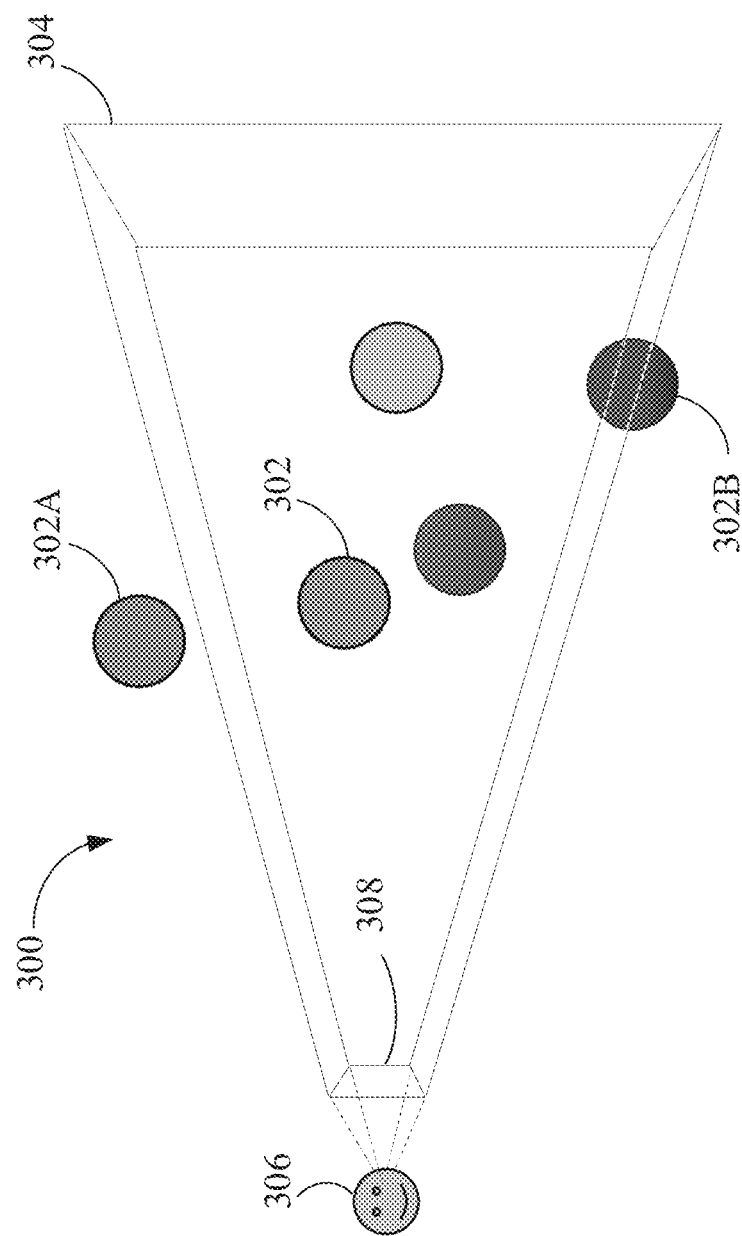
FIG. 3 is a block diagram of a scene to be rendered, according to one embodiment.

FIG. 3 is a block diagram of a scene 300 to be rendered, according to one embodiment. The scene 300 includes a plurality of 3D (three-dimensional) objects 302, 302A-302B. Each object 302 can be comprised of a set of polygons, e.g., triangles. A camera 306 is configured to capture an image of the scene 300. A projection of the scene 300 is captured by the camera 306 and is represented by screen space 308. The view of the scene 300 captured by the camera 306 is represented by viewport 304. As shown, some of the objects, such as object 302A of the scene 300, may be outside the viewport 304. As also shown, some of the objects, such as object 302B, may be partially outside the viewport 304.

In one embodiment, the image of the scene 300 that is displayed on a display device corresponds to the screen space 308. The view of the scene 300 that the camera 306 can see (i.e., the image represented by screen space 308) can change as the camera 306 moves in 3D space relative to the objects 302 in the scene. Also, the objects 302 can move in the scene 300.

Figures 4A, 4B:
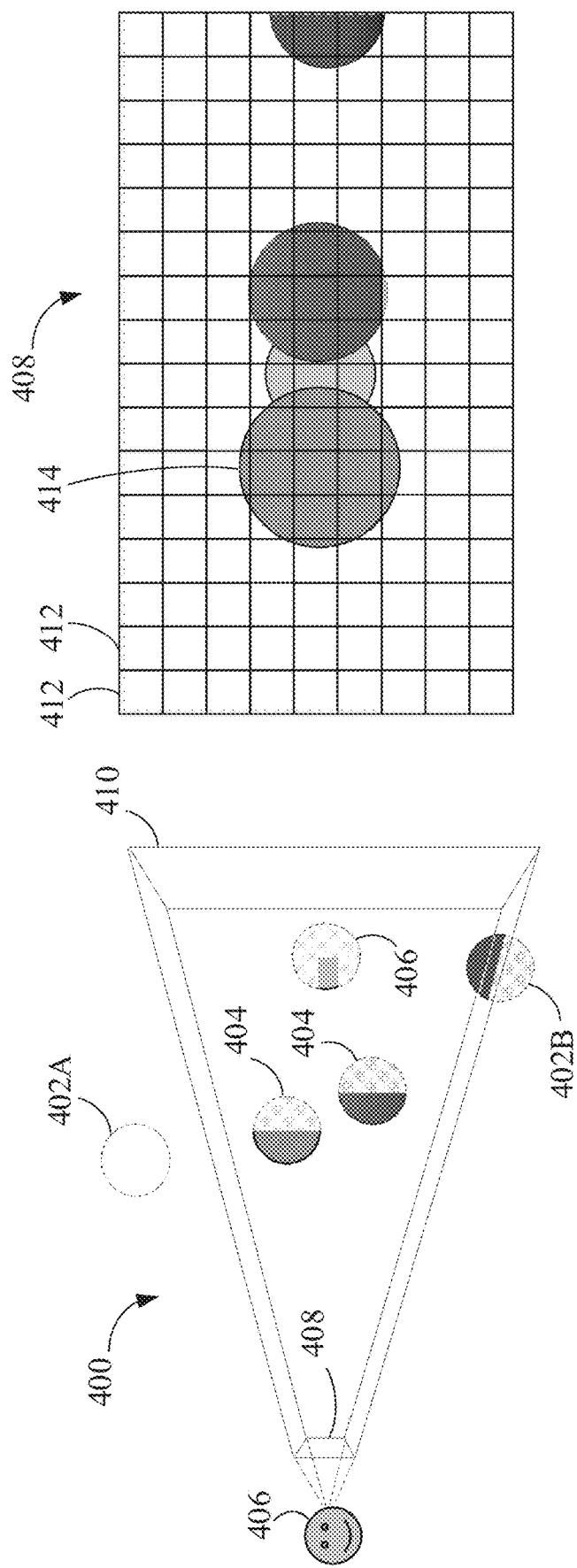
FIG. 4A is a block diagram illustrating rending a scene using rasterization, according to one embodiment.
FIG. 4B is an example of a rasterized image of a scene, according to one embodiment.

FIG. 4A is a block diagram illustrating rendering a scene 400 using rasterization, according to one embodiment. Similar to the image shown in FIG. 3, scene 400 includes a plurality of objects. A camera 406 is configured to capture an image of the scene 400, represented in screen space 408. The camera 406 observes the scene 400 through viewport 410.

The disclosed embodiments involve rasterizing the objects in the scene 400 to generate the image in screen space 408. Rasterization strives to render the pixels as those that are directly visible from the camera 406. Rasterization can provide good performance when the renderer (e.g., processor 110 and/or graphics processor 116) does not need any global information about the scene 400.

One rasterization algorithm takes the 3D scene 400, which is described as objects comprising polygons, and renders the scene onto a 2D surface, usually a computer monitor, in screen space 408. The polygons are themselves represented as collections of triangles. Each triangle is represented by three vertices in 3D space. At a very basic level, rasterizers take a stream of vertices, transform them into corresponding 2D points in screen space 408, and fill in the transformed 2D triangles as appropriate.

Rasterization typically involves culling one or more objects or partial objects. Frustum culling removes any objects outside the viewport 410, such as object 402A. Viewport culling removes portions of objects that are partially overlapping the edge of the viewport 410, such as a portion of object 402B. Backface culling removes a back portion 404 of objects that cannot be seen by the camera 406. In some embodiments, depth testing can be performed to remove, on a per pixel basis in screen space 408, portions 406 of objects that are occluded by other objects.

When rasterization is complete, an image of scene in screen space 408 is generated. In some embodiments, pixel density of the screen space 408 can also result in information loss about the objects in the scene 400.

FIG. 4B is an example of a rasterized image of a scene, according to one embodiment. The image shown in FIG. 4B represents the image in screen space 408 of the scene 400 captured by the camera 406 in FIG. 4A.

For each pixel 412 in screen space 408, the processor has access to data corresponding to the position of the object within the pixel, the color of the object, the object's orientation, properties of the object (e.g., transparency, translucency, transmission coefficient, index of refraction, etc.), and/or surface roughness information, etc. The result of rasterization is, therefore, a 2D image with relatively limited information of the actual 3D scene. When one or more of the objects in the scene is non-opaque (i.e., includes properties of transparency or translucency), properly rendering the image can be a difficult problem to solve.

Figure 5:
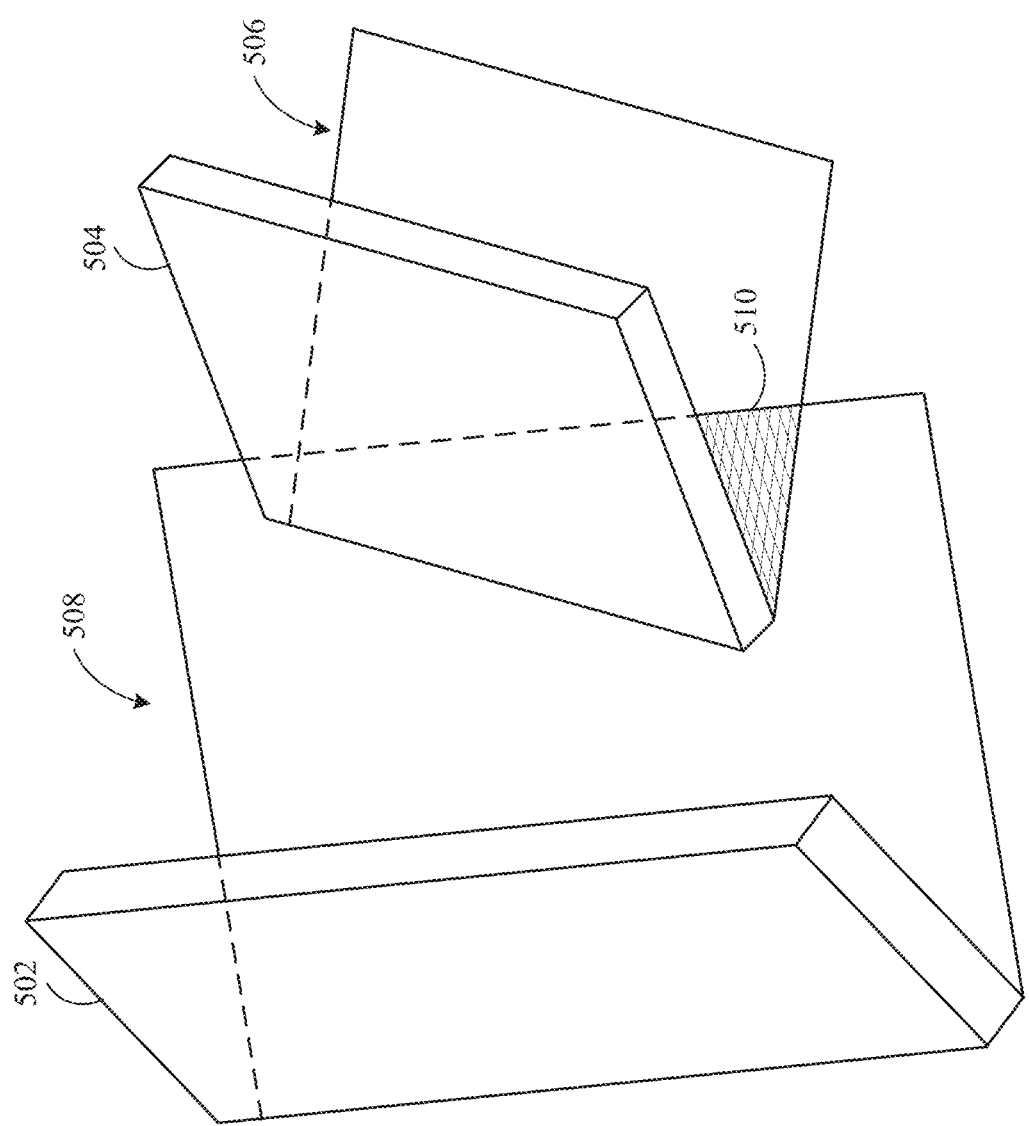
FIG. 5 is a block diagram illustrating light traveling through colored transparent objects and causing colored shadows, according to one embodiment.

FIG. 5 is a block diagram illustrating light traveling through colored transparent objects and causing colored shadows, according to one embodiment. As shown in FIG. 5, a scene can include transparent objects 502 and 504. Each of transparent objects 502 and 504 may be associated with a color. The colors of the objects 502, 504 can be the same color or different colors. Light that travels through transparent object 502 casts shadow 508. Light that travels through transparent object 504 casts shadow 506.

Each of the shadows 508 and 506 includes respective lighting properties. Lighting properties of a shadow include a color for the shadow and brightness level for the shadow. The color of the shadow corresponds to the color of the transparent object through which the light passed through to cause the shadow. Non-transparent (i.e., opaque) objects cast dark (i.e., black) shadows. In some implementations, the brightness level of a shadow through a transparent object corresponds to an amount of light that travels through an object to cast the respective shadow. The brightness level can be based on a transmission coefficient of the medium of the object. In other words, the transmitted light can be dimmed based on the transmission coefficient.

As shown in FIG. 5, area 510 is an area that is covered by both shadows 508 and 506. Area 510 is a shadowed area that has lighting properties (e.g., color and brightness) that are a combination of the lighting properties of the two shadows 508 and 506. Embodiments of the disclosure provide a system and method to render the shadows 508, 506 through transparent objects 502, 504, as well as the combined shadow in area 510.

Figure 6A:
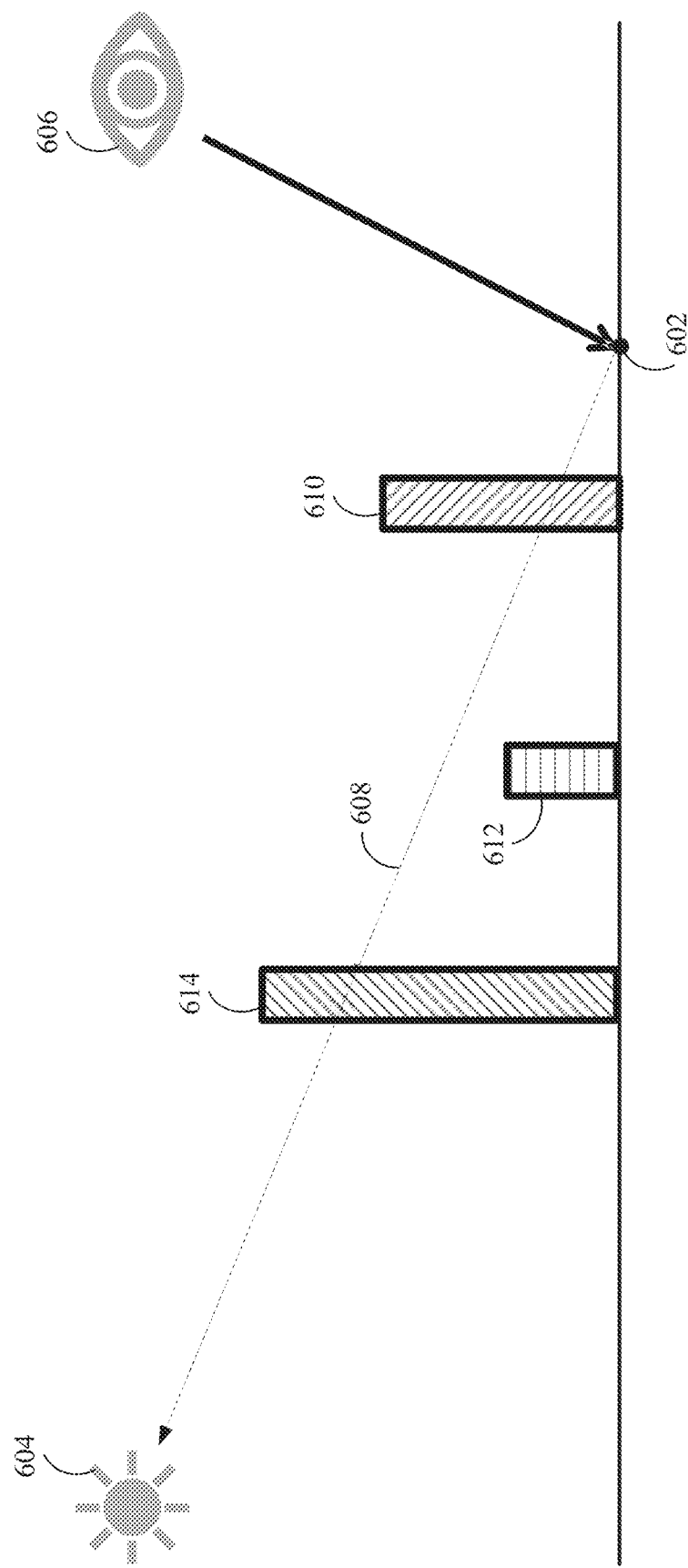

FIGS. 6A-6F are block diagrams illustrating rendering of shadows through transparent objects using ray tracing, according to one embodiment. In FIG. 6A, a scene includes objects 610, 612, 614 and a light source 604. A camera 606 captures an image of the scene. Screen space rasterization can be used to generate an image of the scene from the perspective of the camera 606, as described in FIGS. 4A-4B. The embodiment shown in FIGS. 6A-6F can be used to add shadows, including shadows through transparent objects, using ray tracing. The shadows can be colored or colorless, depending on the color of the transparent object that casts the shadow.

As shown in FIG. 6A, point 602 is a location on an object (i.e., a floor) in the scene that is visible to the camera. A three-dimensional scene-space coordinate position of the point 602 can be determined during rasterization. In the disclosed embodiments, a ray is launched from point 602 towards the light source 604 to generate shadow information for point 602.

FIG. 6B illustrates ray 616 being launched from point 602 towards the light source 604. The ray 616 intersects object 610 at location 618 at a boundary of object 610. In one implementation, if the object 610 is opaque, the shadow rendering technique terminates, as the point 602 is occluded from the light source. Thus, a dark (i.e., black color) shadow is produced at point 602.

However, if the object 610 is transparent, the rendering algorithm continues. In one implementation, lighting information at the location 618 is determined. The lighting information at the location 618 is accumulated into an accumulated lighting information value to be used for rendering the shadow at point 602. The accumulated lighting information value may have an initial value that represents no objects between the point 602 and the light source 604 (e.g., a white color value).

In one embodiment, accumulating the lighting information value comprises multiplying a current value (e.g., the initial value) by a lighting information value at the location 618. The lighting information value at location 618 may comprise one or more components, including a color component and a brightness component. The color component corresponds to the color of the surface at location 618. The brightness component corresponds to a transmission coefficient of the object 610, which represents the amount of light that is transmitted through the object.

Figure 6C:
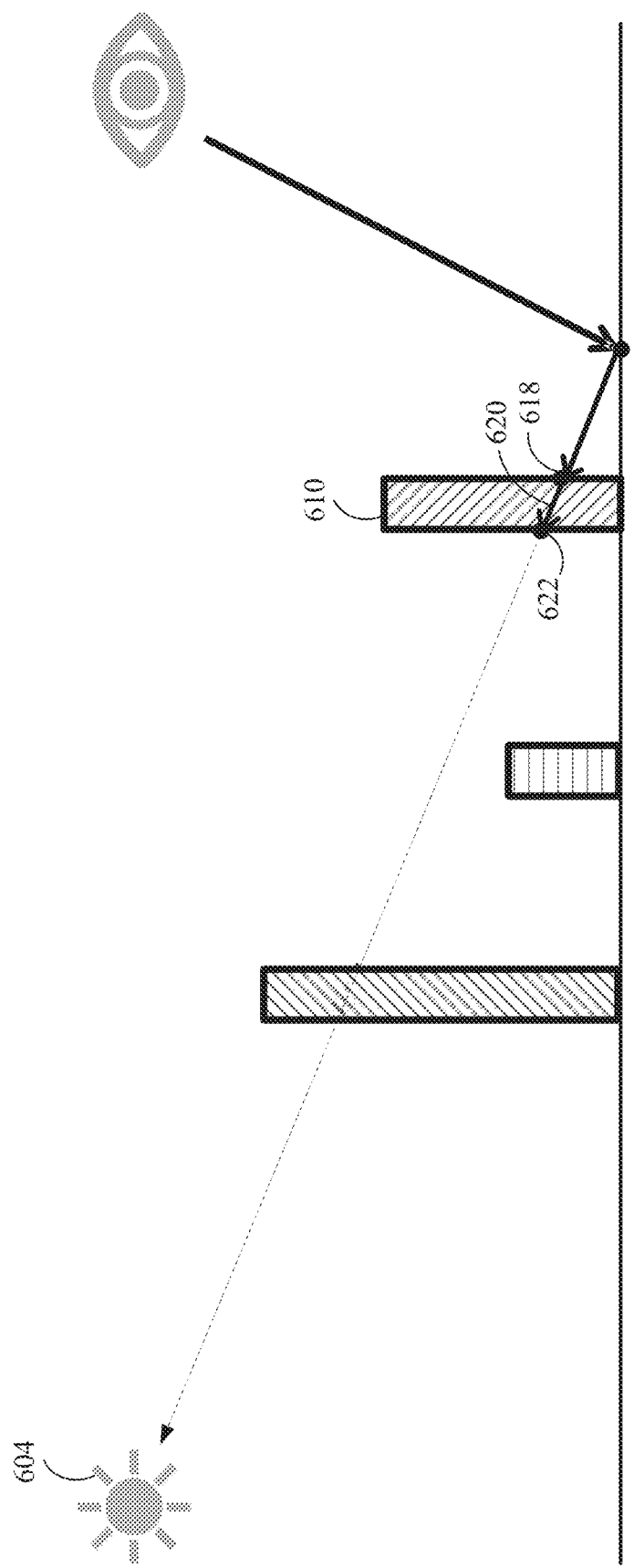

In one embodiment, rays are recursively cast starting at each object boundary intersected by the previous ray towards the light source. As shown in FIG. 6C, a ray 620 is cast from location 618 towards the light source 604. The ray 620 intersects an object boundary on the back side of object 610 at location 622.

In one embodiment, no lighting information accumulation for the shadow occurs for rays that travel within a transparent object. In another embodiment, no lighting information accumulation for the shadow occurs at a location where a ray exits a transparent object (i.e., at location 622). In these embodiments, lighting information accumulation occurs at the first point of intersection of a ray with a transparent object (i.e., at point 618). Such an implementation mimics objects that are modeled as though a thin colored film is placed on the front side of the object (i.e., a surface that includes location 618), with the rest of the object being clear, including the back surface of the object where the ray towards the light source exits the transparent object (i.e., location 622).

In another embodiment, lighting information accumulation also occurs for the shadow at a location where a ray exits a transparent object (i.e., at location 622). Such an implementation mimics objects that are modeled as though a thin colored film is placed on both the front side and the back side of the object, although the interior of the object is clear or colorless.

In yet another embodiment, lighting information can be accumulated for the shadow as a ray travels through a transparent object. In one implementation, lighting information is accumulated based on a distance traveled through a colored transparent object. Such an implementation mimics objects that are modeled as though the entire medium of the transparent object is colored, not merely a thin colored film placed over the outside of the object.

Figure 6D:
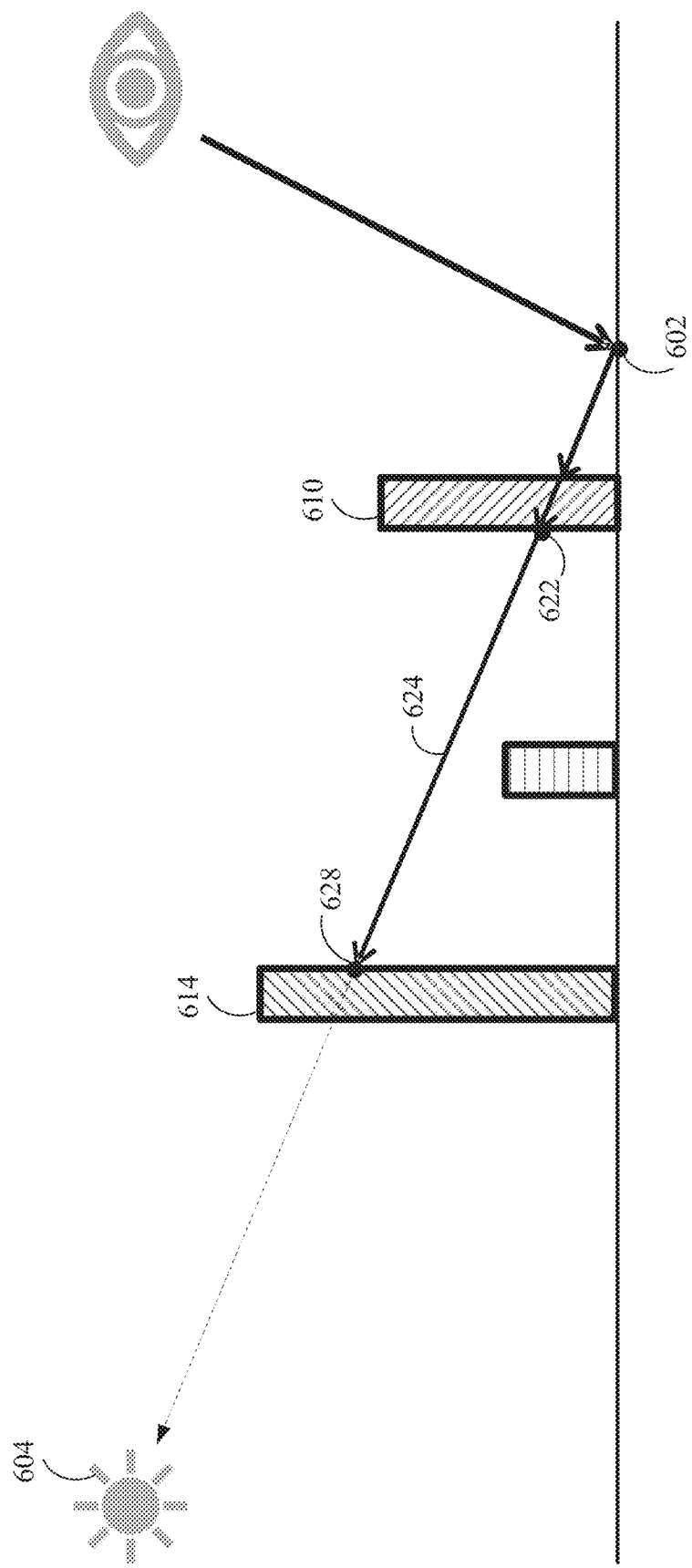

As shown in FIG. 6D, the recursive ray tracing continues, where ray 624 is launched from location 622 towards the light source 604. The ray 624 intersects object 614 at location 628 at a boundary of the object 614. In one implementation, if the object 614 is opaque, the shadow rendering technique terminates, as the point 602 is occluded from the light source 604. Thus, a dark shadow (i.e., black shadow) is produced at point 602. In one implementation, the accumulated lighting information value is set to a value that represents a black shadow.

However, if the object 614 is transparent (i.e., like object 610), then the rendering algorithm continues. As discussed above, lighting information at the location 628 is accumulated into the accumulated lighting information value to be used for the shadow at point 602. As such, the accumulated lighting information value includes contribution from object 610 and object 614, including color contributions and brightness contributions from both objects. In one embodiment, the lighting information comprises a color value corresponding to a color of a surface of an object intersected by the ray, where the color value is modulated based on a brightness value corresponding to a transmission coefficient of the surface interaction with the intersected ray (for example, by multiplying the color value by the brightness value).

Figure 6E:
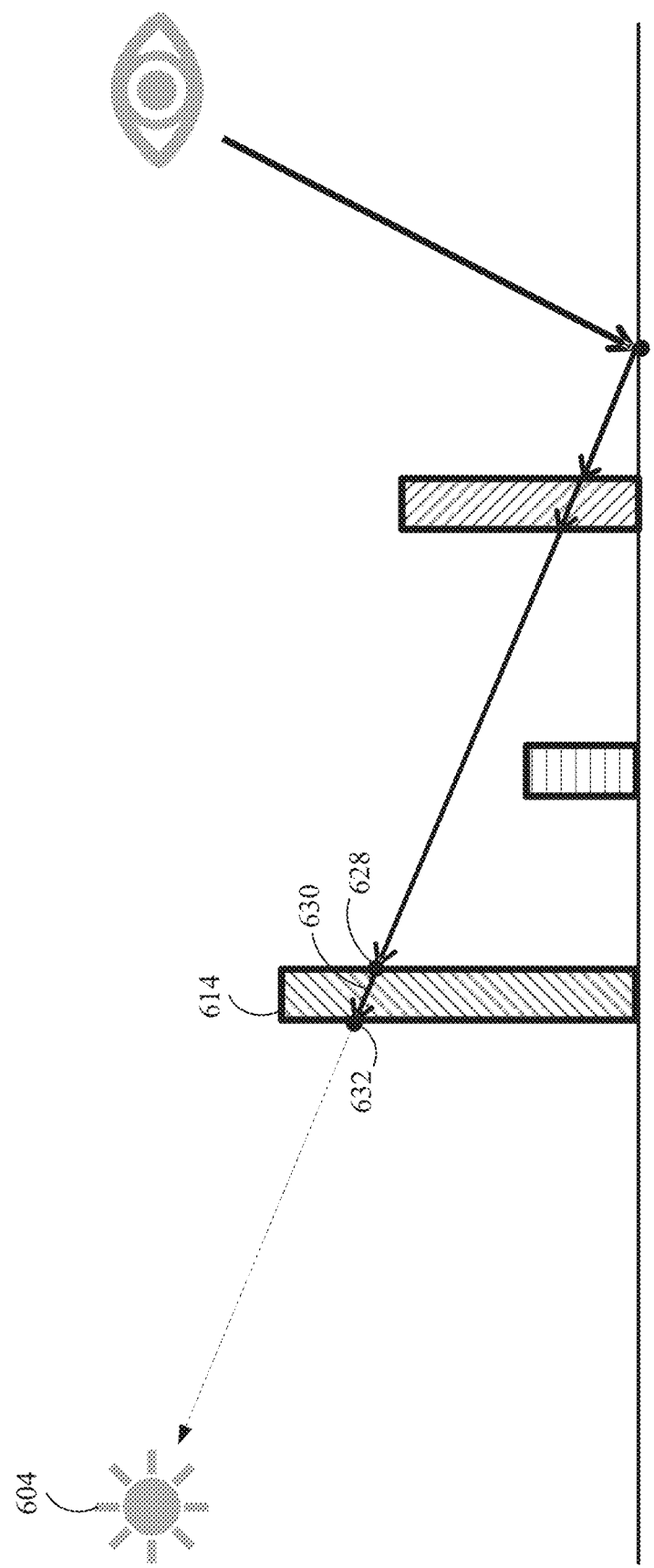

As shown in FIG. 6E, the recursive ray tracing continues, where ray 630 is launched from location 628 towards the light source 604. The ray 630 intersects object 614 at location 632 at a boundary of object 614. In some embodiments, no lighting information accumulation occurs for rays that travel within a transparent object and/or at the location where a ray exits a transparent object, as described above. In other embodiments, lighting information can be accumulated as a ray exits a transparent object and/or as a ray travels through a transparent object based on a distance traveled through the transparent object, as also described above.

Figure 6F:
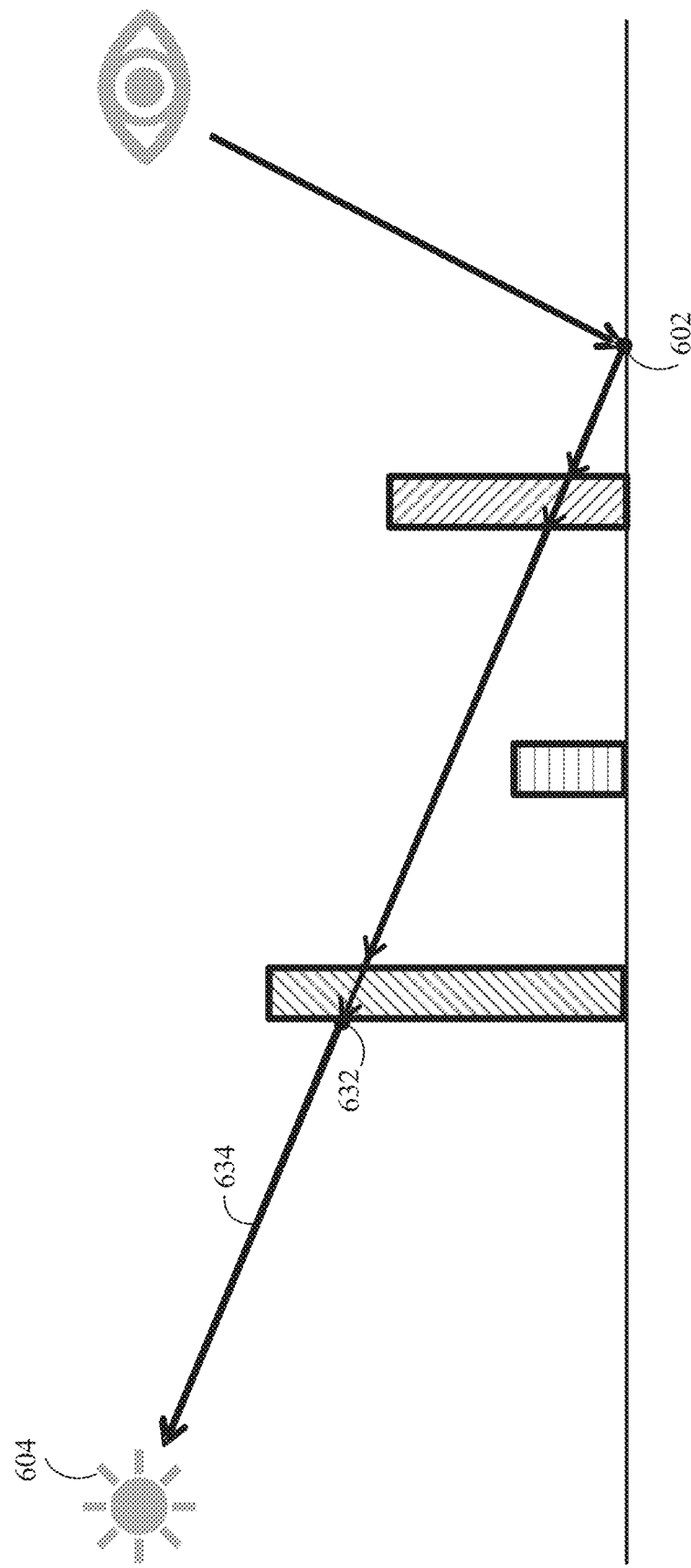

As shown in FIG. 6F, the recursive ray tracing continues, where ray 634 is launched from location 632 towards the light source 604. The ray 634 exits the scene (e.g., intersects with a bounding box for the scene), and thus the ray tracing terminates. The accumulated lighting information value, which includes color and brightness contributions from object 610 and object 614, is used to render a shadow at the pixel in screen space corresponding to the point 602.

In embodiments where there are multiple light sources, ray tracing originating at point 602 can be repeated towards each light source. The results from ray tracing towards each light source can be aggregated together to form the final lighting information value for the shadow at point 602, for example, by accumulating the results for each light source.

Figure 7:
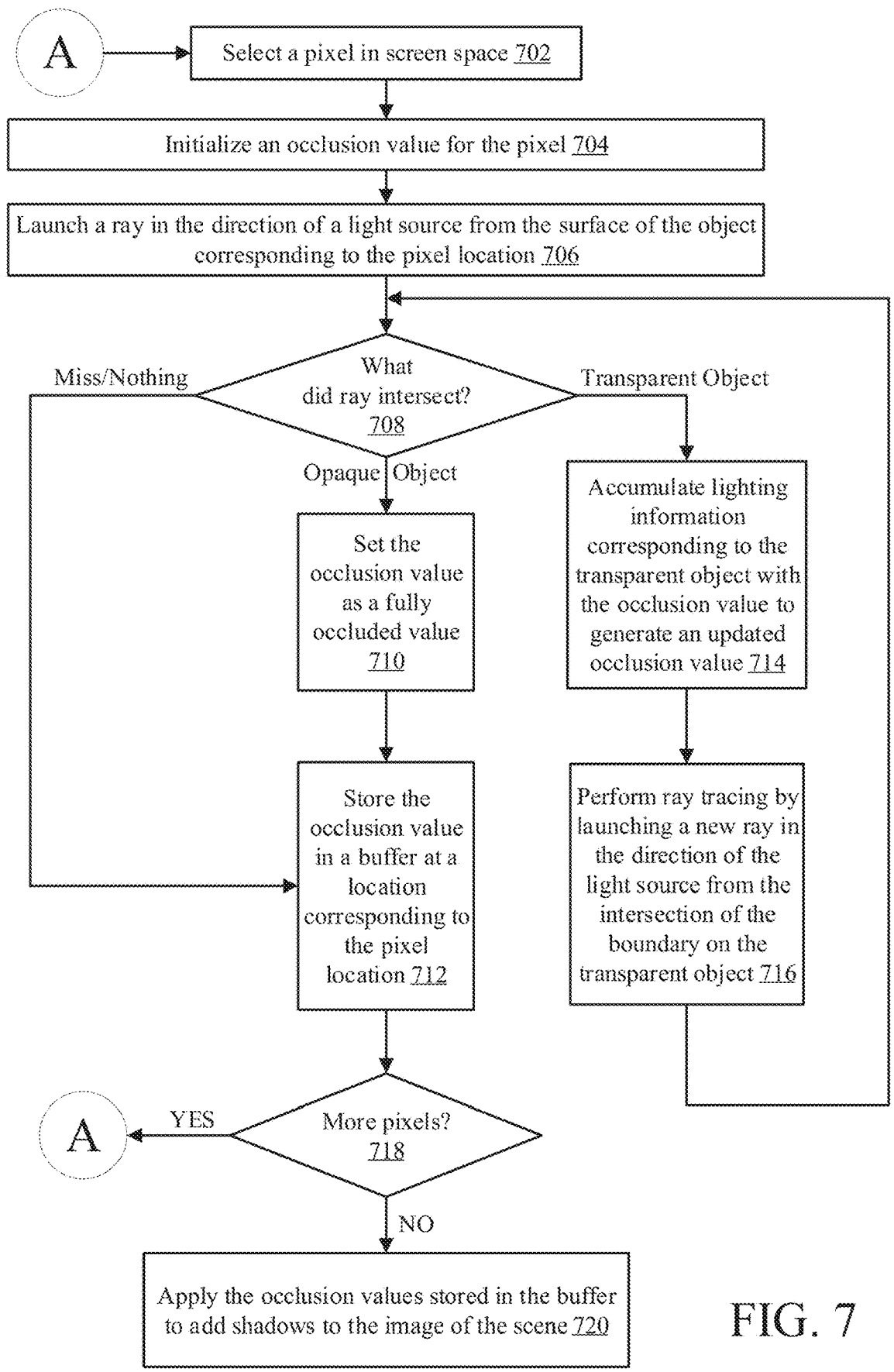
FIG. 7 is a flow diagram of method steps for rending shadows for transparent objects, according to one embodiment.

FIG. 7 is a flow diagram of method steps for rending shadows for transparent objects, according to one embodiment. In various implementations, the method can be performed by the processor 110, the graphics processor 116, or a combination of the processor 110 and the graphics processor 116.

As shown, the method begins at step 702, where a processor selects a pixel in screen space. The pixels in screen space are those pixels that are visible to a camera that is capturing an image of the scene. In one implementation, rasterization can be used to generate the pixels in screen space. For example, a depth buffer can be used to determine which objects are visible to the camera. As such, for each pixel location in screen space, a three-dimensional scene space (i.e., "world space") coordinate location for the pixel can be determined during rasterization.

At step 704, the processor initializes an occlusion value for the pixel. The occlusion value corresponds to lighting information for the shadow to be applied to the pixel. Initializing the occlusion value can include setting the occlusion value to a color value that corresponds to an unoccluded pixel, i.e., no objects exist between the location on the object corresponding to the pixel and the light source, thus no shadow. For example, the initialized value for the occlusion value can be a white color value.

At step 706, the processor performs ray tracing by launching a ray in the direction of the light source from the surface of the object corresponding to the pixel location. At step 708, the processor determines with what did the ray intersect. If the processor determines that the ray intersects with an opaque object, then at step 710, the processor sets the occlusion value as a fully occluded value. In such a scenario, the opaque object is occluding the surface of the object corresponding to the pixel location. The fully occluded value for the occlusion value is a black color value.

At step 712, the processor stores the occlusion value in a buffer at a location corresponding to the pixel location selected at step 702. In one embodiment, the occlusion value is stored in a screen space buffer at a pixel location corresponding to the pixel selected at step 702. In one implementation, the buffer is a shadow buffer that, once all pixels are processed to determine the occlusion values for each pixel, the shadow buffer can be applied as an overlay to the rasterization results to add shadows to the image of the scene. In one implementation, the shadow buffer can be stored as a screen-space texture that includes shadow information that is applied to a rasterized image of the scene during a lighting stage.

From step 712, the method proceeds to step 718, where the processor determines whether any more pixels in screen space are left to be processed. If yes, the method returns to step 702.

Referring back to step 708, if the processor determines that the ray does not intersect with any objects in the scene, then at step 712, the processor stores the occlusion value in a buffer at a location corresponding to the pixel location selected at step 702. If the ray being analyzed is the initial ray that is cast from the surface of the object corresponding to the pixel location, then the occlusion value stored for the pixel location at step 712 is the initialized occlusion value. As described below, however, if the ray has passed through one or more transparent objects, the occlusion value has accumulated lighting information from the one or more transparent objects.

Referring back to step 708, if the processor determines that the ray intersects with a transparent object boundary, then at step 714, the processor accumulates lighting information corresponding to the intersected object with the occlusion value to generate an updated occlusion value. The lighting information may be a numerical value that is based on color information and/or brightness information at the object boundary. Accumulating the color may comprise multiplying a value corresponding to the lighting information of the intersected object with the (current) occlusion value, which was originally initialized to a white color value.

At step 716, the processor performs ray tracing by launching a new ray in the direction of the light source from the intersection of the boundary on the transparent object. The method then returns to step 708, described above, where the processor determines what, if any, objects are intersected by the new ray. In this manner, ray tracing is performed recursively at each intersection of a boundary of a transparent object, where color information is accumulated for each transparent object that is intersected by the ray tracing. The recursive process terminates when the ray either intersects an opaque object or exits the scene.

If, at step 718, the processor determines that no more pixels in screen space are left to be processed, the method proceeds to step 720, where the occlusion values stored in the buffer are applied to an image of the scene to add shadows to the scene. In some cases, the occlusion values stored in the buffer includes colored shadow information (i.e., caused by light casting shadows after passing through one or more colored transparent objects); thus, ray-traced colored shadows are rendered.

The process described in FIG. 7 is repeated frame-to-frame to render shadows for the scene. In some embodiments, temporal filtering can be applied to accumulate lighting results over a series of frames, e.g., by averaging the results for a pixel from frame-to-frame. In addition, in some embodiments, spatial filtering can also be used as well to combine results from nearby pixel locations by blurring (e.g., averaging) them together to provide a de-noising effect. In some embodiments, temporal and spatial filtering can include a weighted averaging of the lighting results by utilizing additional information, such as the surface normal or a depth buffer.

Figure 8:
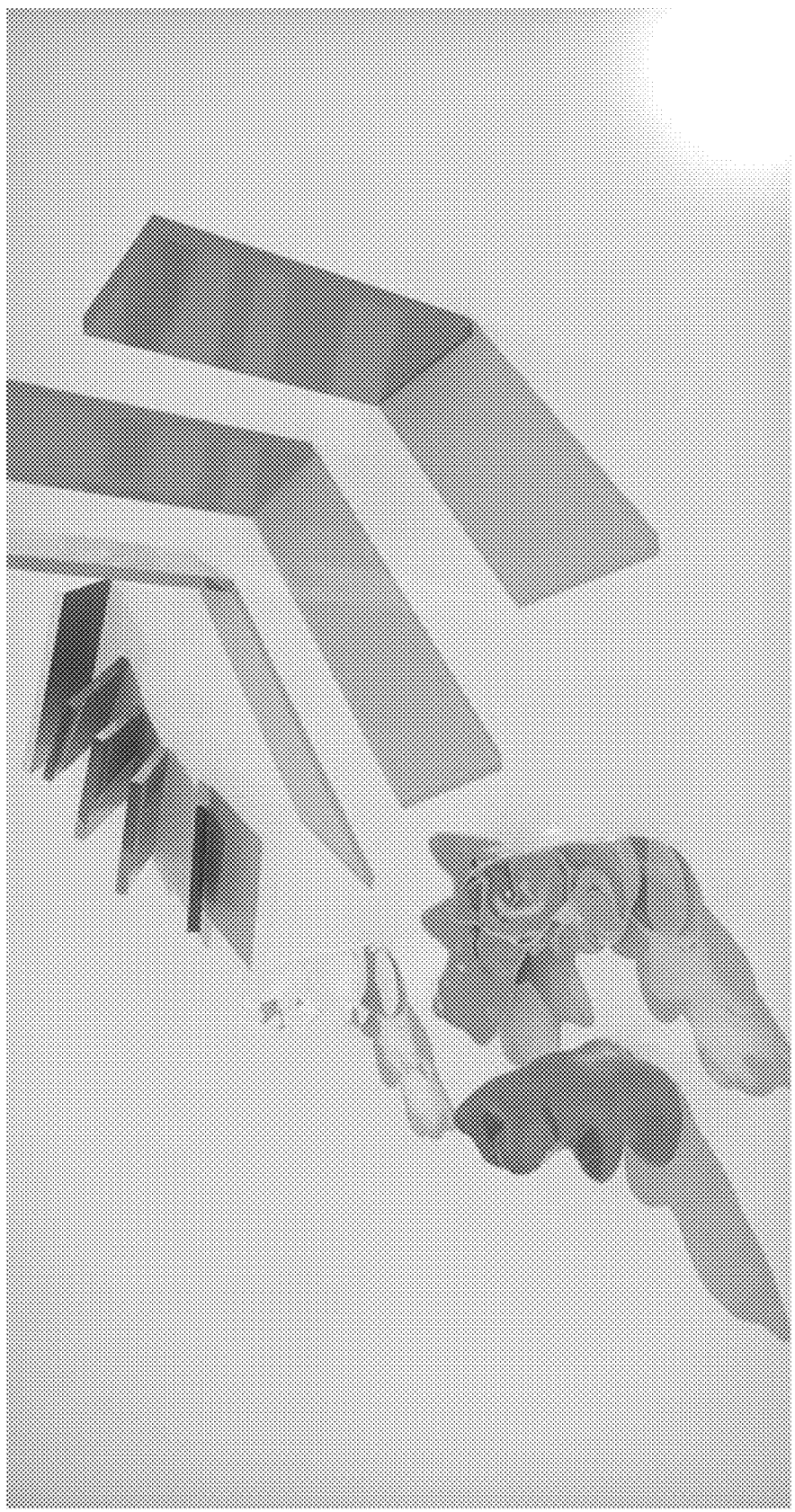
FIG. 8 is an example image with hard shadows, according to one embodiment.
Figure 9:
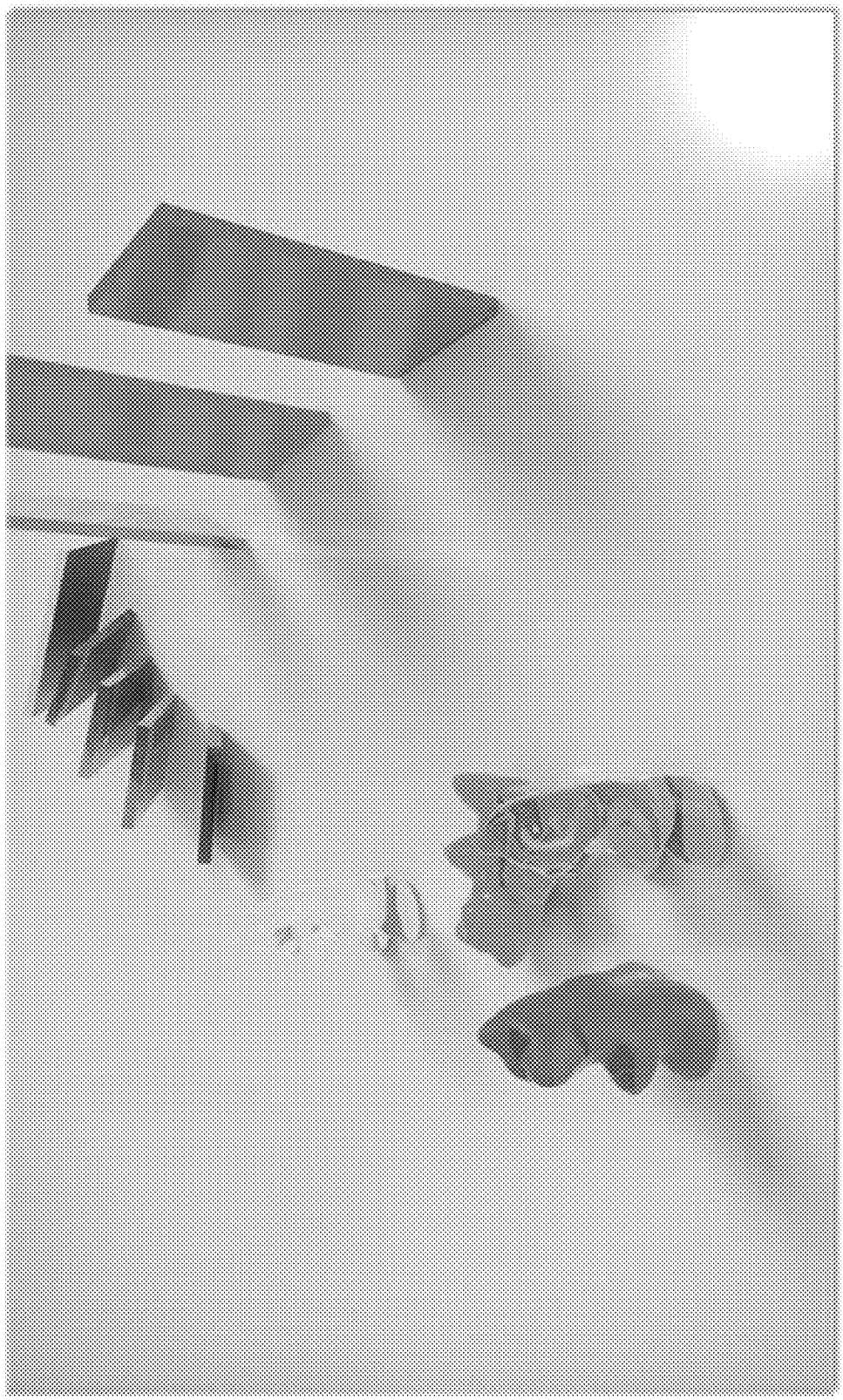
FIG. 9 is an example image with soft shadows, according to one embodiment.

In some embodiments, the shadow that is generated by an object (opaque or transparent) is dependent on the size of the light source. For small light sources, such as a point light source, a "hard" shadow is generated, since the light comes from one direction. For large light sources, such as an area light source, a "soft" shadow is generated, since the light comes from many different directions. FIG. 8 is an example image with hard shadows, according to one embodiment. FIG. 9 is an example image with soft shadows, according to one embodiment.

In one embodiment, the method described in FIG. 7 can be used to generate hard shadows by launching on ray per pixel location.

Figure 10:
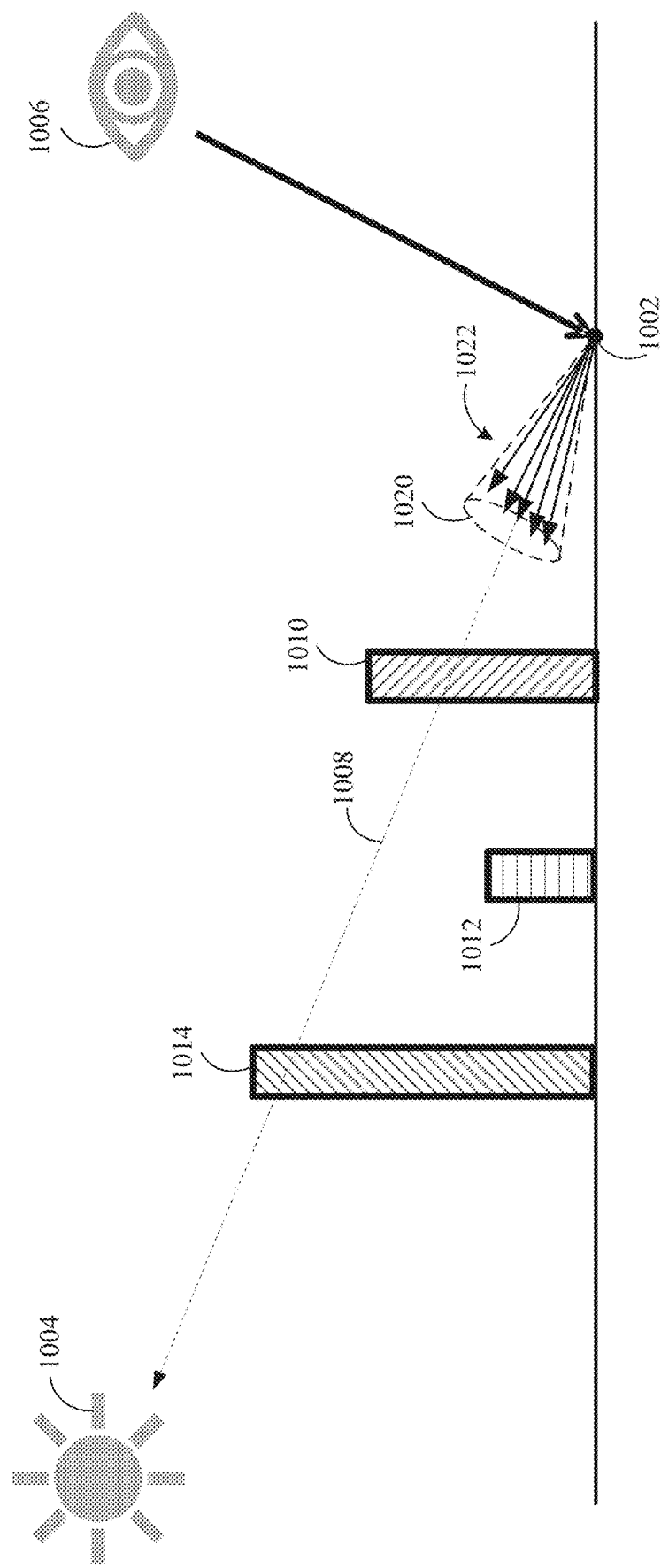
FIG. 10 is a block diagram illustrating generating soft shadows, according to one embodiment.

FIG. 10 is a block diagram illustrating generating soft shadows, according to one embodiment. In FIG. 10, a scene includes objects 1010, 1012, 1014 and a light source 1004. A camera 1006 captures an image of the scene. Screen space rasterization can be used to generate an image of the scene from the perspective of the camera 1006, as described in FIGS. 4A-4B.

As shown in FIG. 10, point 1002 is a location on an object (i.e., a floor) in the scene that is visible to the camera 1006. A three-dimensional scene-space coordinate position of the point 1002 can be determined during rasterization. However, in FIG. 10, the light source is an area light source that generates soft shadows from transparent (and opaque) objects.

To generate soft shadows through transparent objects, a plurality of rays 1022 are cast towards the light source 1004. The directions of the rays in the plurality of rays 1022 can be bounded by a cone 1020 centered along a line between the point 1002 and a center of the light source 1004. In one implementation, the directions of the rays can be selected at random, e.g., by Monte Carlo sampling. In one embodiment, the size of the cone 1020 is dependent on the size of the light source, where a larger light source corresponds to a larger cone 1020. Also, the number of rays to be cast can be set based on performance requirements. In some instances, just one ray in the plurality of rays is cast per frame, and the results from multiple rays cast in different directions over a series of frames can be filtered together to produce a final result.

Each ray of the plurality of rays can be launched from point 1002 towards the light source 1004 to generate lighting information for the shadow at point 1002, as described in FIG. 7. Lighting information from transparent objects traversed by each ray is accumulated into an occlusion value for the ray. The occlusion values of the rays in the plurality of rays can be aggregated to form a final occlusion value for the point 1002. In one embodiment, aggregating the occlusion values comprises taking and average of the occlusion values for each ray. In some implementations, aggregating the occlusion values comprises taking a weighted average of the occlusion values, where occlusion values corresponding to rays closer to the line 1008 in the center of the cone 1020 are given greater weighting.

The shadow rendering technique described in FIG. 10 is repeated frame-to-frame to render shadows for the scene. In some embodiments, temporal filtering can be applied to accumulate lighting results over a series of frames, e.g., by averaging the results. In addition, in some embodiments, spatial filtering can also be used as well to combine results from nearby pixel locations by blurring (e.g., averaging) them together to provide a de-noising effect. In some embodiments, spatial filtering can also be used in combination with additional surface information, such as the normal direction or a depth buffer, to perform a weighted averaging of results from nearby pixel locations.

In general, in computer graphics, including caustics in shadows provides more visually pleasing results. Caustics are lighting effects that take into account redirection of light that interacts with a medium, where the light can be reflected, refracted, bounced off mirrors, or concentrated by a lens, for example. Including these effects in a rendered image more accurately simulates the ways real light moves through a scene. The embodiment described in FIG. 7, however, does not take caustics into account. The rays are recursively cast to continue along a path towards the light source, without taking into account reflection or refraction of rays at surface boundary intersections.

Figure 11:
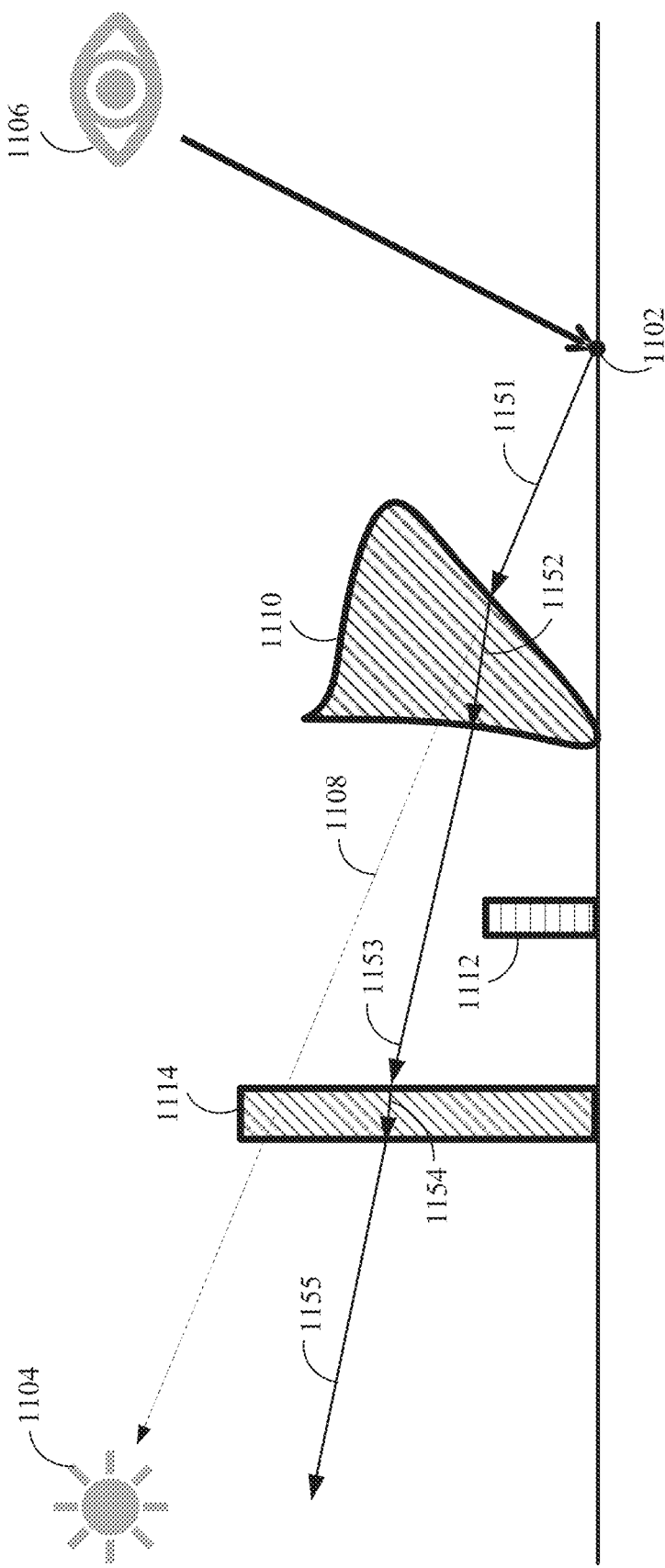
FIG. 11 is a block diagram illustrating approximating caustics in transparent shadows using ray tracing, according to one embodiment.

Further embodiments of the disclosure provide a technique to approximate caustics in transparent shadows, including colored transparent shadows, using ray tracing. FIG. 11 is a block diagram illustrating approximating caustics in transparent shadows using ray tracing, according to one embodiment. Similar to the block diagram shown in FIG. 10, in FIG. 11, a scene includes objects 1110, 1112, 1114 and a light source 1104. A camera 1106 captures an image of the scene. Screen space rasterization can be used to generate an image of the scene from the perspective of the camera 1106, as described in FIGS. 4A-4B.

In one embodiment, a ray 1151 is cast from point 1102 in the direction of the light source 1104, as described previously. The direction of the ray 1151 originating at point 1102 is represented by line 1108.

In one embodiment, as described above, when ray 1151 intersects a transparent object (such as object 1110), lighting information from the transparent object is accumulated into an occlusion value for the pixel corresponding to point 1102. In the embodiment in FIGS. 6A-6F and FIG. 7, rays are recursively cast along line 1108 towards the light source 1004, accumulating color at each transparent object boundary that is intersected. In FIG. 7, no reflection or refraction is taken into account at each surface boundary.

However, in the embodiment in FIG. 11, when the ray 1151 intersects a boundary of an object, the ray can be reflected or refracted. In one embodiment, refraction and reflection of rays is determined using the Fresnel equations, which take into account the angle of incident light, a surface orientation of the object being intersected, a refractive index of the medium before the intersection (e.g., air), and a refractive index of the medium after the intersection (e.g., the transparent object).

In FIG. 11, ray 1151 is refracted after it intersects object 1110. A new ray 1152 is cast in the refracted direction. When refracted ray 1152 intersects an object boundary (i.e., upon exiting object 1110), the ray is further refracted, and a new ray 1153 is cast in the further refracted direction. Similarly, ray 1153 is refracted at the boundary of intersection with another transparent object 1114. Refracted ray 1154 is then generated. When refracted ray 1154 intersects an object boundary (i.e., upon exiting object 1114), the refracted ray 1154 is still further refracted, and a new ray 1155 is cast. Lighting information is accumulated from each transparent object intersected by the rays as they reflect or refract through a scene.

As shown in FIG. 11, ray 1155 exits the scene without intersecting any other objects, which indicates that the recursive ray tracing is terminated. In one embodiment, to approximate caustics, the lighting value accumulated from performing the recursive ray tracing is adjusted based on a divergence between the direction of the ray that exited the scene (i.e., ray 1155) and the direction of the original ray 1151 towards the light source (i.e., along line 1108). In one implementation, adjusting the accumulated lighting value is based on applying a monotonically increasing function with a range (for example, 0 to 1), which equals 0 when the directions of the two rays are perpendicular, and equals 1 when the when the directions of the two rays are parallel.

In one implementation, adjusting the accumulated lighting value is based on applying a Factor to the accumulated lighting value that can be set according to the equation:

$$\text{Factor} = (\text{Refracted\_Ray} \cdot L)^N$$

where Refracted_Ray corresponds to the direction of the ray exiting the scene (e.g., ray 1155), L corresponds to the direction of the original ray towards the light source (e.g., ray 1151), N corresponds to any positive non-zero real number, and the operator "·" corresponds to computing a dot product or inner product of Refracted_Ray and L.

In this manner, refracted rays that deviate significantly from the original ray direction along line 1108 contribute less to the final color value.

Figure 12A:
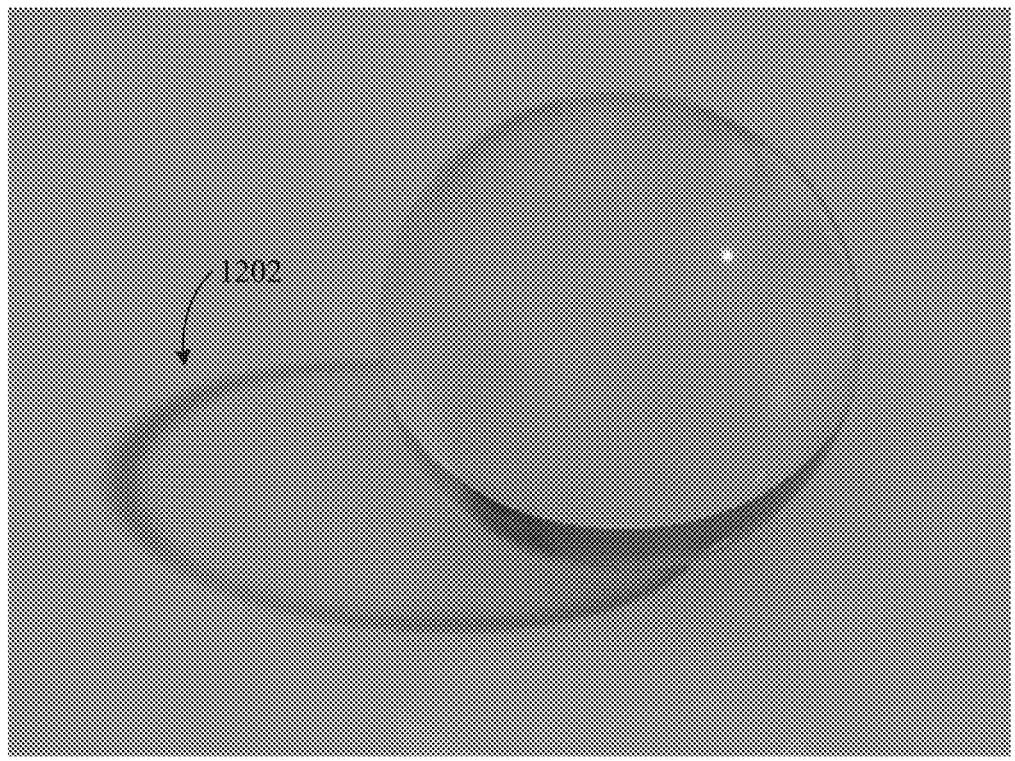
FIG. 12A is an example of a transparent object with a shadow that does not approximate caustics, according to one embodiment.
Figure 12B:
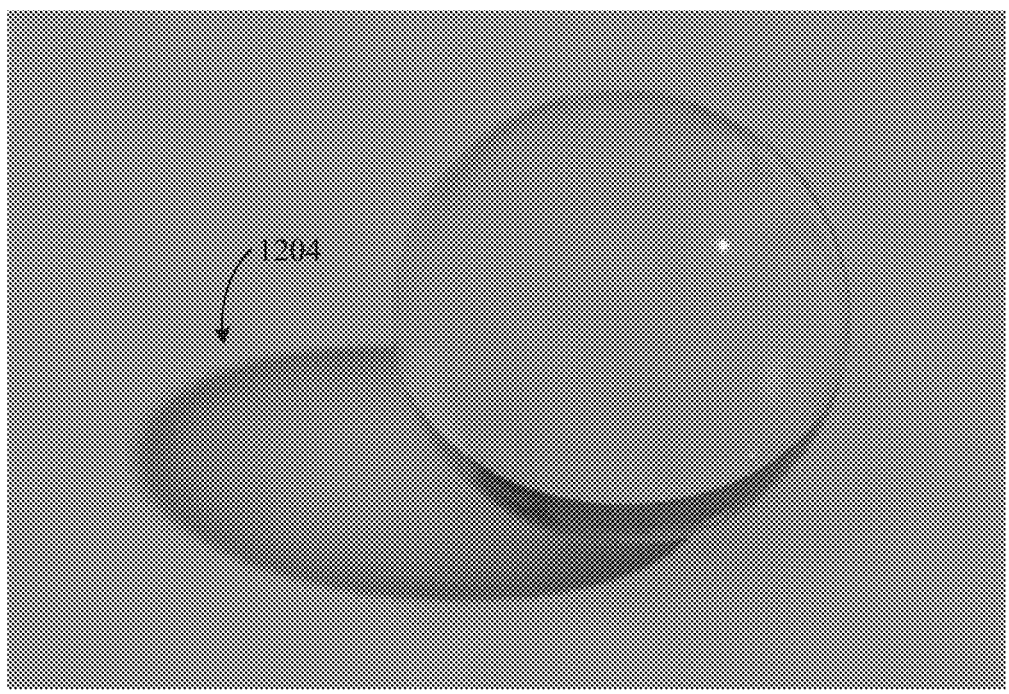
FIG. 12B is an example of a transparent object with a shadow that does approximate caustics, according to one embodiment.

FIG. 12A is an example of a transparent object with a shadow 1202 that does not approximate caustics, according to one embodiment. The shadow 1202 has substantially similar lighting information across the area of the shadow 1202, wherein the variation is substantially a result of the transmission coefficient. FIG. 12B is an example of a transparent object with a shadow 1204 that does approximate caustics, according to one embodiment. In FIG. 12B, the shadow 1204 that is produced takes into account refraction of light through the object by analyzing a divergence of the rays cast towards the light source after refraction and a ray cast towards the light source without refraction, as described above. Doing so results in a concentration of light towards the center of the shadow. Although the results do not generate physically accurate caustics, the results do provide an approximation of the caustics, which results more visually pleasing rendering.

In some embodiments, the rendering technique shown in FIG. 11 can be combined with the rendering technique shown in FIG. 10 to produce soft shadows that approximate caustics.

Figure 13:
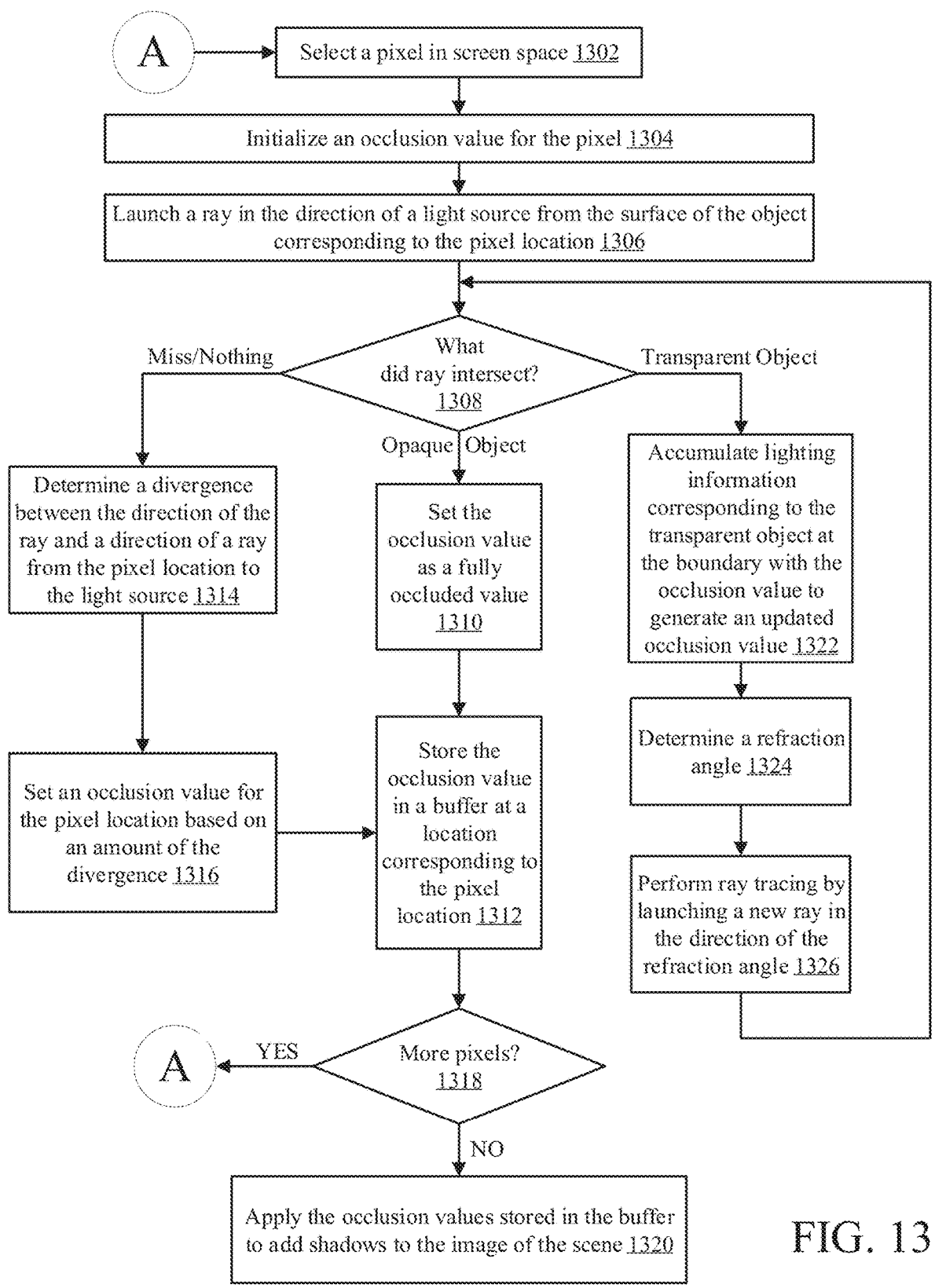
FIG. 13 is a flow diagram of method steps for rending shadows for transparent objects, according to one embodiment.

FIG. 13 is a flow diagram of method steps for rending shadows for transparent objects, according to one embodiment. The method of FIG. 13 takes into account reflection and/or refraction at object boundaries, as described below. In various implementations, the method can be performed by the processor 110, the graphics processor 116, or a combination of the processor 110 and the graphics processor 116.

As shown, the method begins at step 1302, where a processor selects a pixel in screen space. At step 1304, the processor initializes an occlusion value for the pixel. At step 1306, the processor performs ray tracing by launching a ray in the direction of a light source from the surface of the object corresponding to the pixel location. In one implementation, steps 1302, 1304, and 1306 in FIG. 13 are similar to step 702, 704, and 706, respectively, described in FIG. 7.

At step 1308, the processor determines with what did the ray intersect. If the processor determines that the ray intersects with an opaque object, then at step 1310, the processor sets the occlusion value as a fully occluded value. In such a scenario, the opaque object is occluding the surface of the object corresponding to the pixel location. In one implementation, the fully occluded value for the occlusion value is a black color value.

At step 1312, the processor stores the occlusion value in a buffer at a location corresponding to the pixel location selected at step 1302. In one embodiment, the occlusion value is stored in a screen space buffer at a pixel location corresponding to the pixel selected at step 1302. In one implementation, the buffer is a shadow buffer that, once all pixels are processed to determine the occlusion values for each pixel, the shadow buffer can be applied as an overlay to the rasterization results to add shadows to the image of the scene. In one implementation, the shadow buffer can be stored as a screen-space texture that includes shadow information that is applied to a rasterized image of the scene during a lighting stage.

From step 1312, the method proceeds to step 1318, where the processor determines whether any more pixels in screen space are left to be processed. If yes, the method returns to step 1302.

Referring back to step 1308, if the processor determines that the ray does not intersect with any objects in the scene, then at step 1314, the processor determines a divergence between the direction of the ray (i.e., the current ray that exited the scene) and a direction of a ray from the surface of the object corresponding to the pixel location selected at step 1302 and the light source. If the direction of the current ray is the same as the direction of the ray from the surface of the object corresponding to the pixel location selected at step 1302 towards the light source, then the divergence is zero.

At step 1316, the processor sets an occlusion value for the pixel location based on an amount of the divergence. In one embodiment, setting the occlusion value at step 1316 comprises adjusting a current occlusion value based on the amount of the divergence. In one embodiment, a greater divergence corresponds to less lighting contribution for the shadow at the pixel location. For example, the brightness value of the occlusion value can be lowered proportionate to the amount of divergence. The method then proceeds to step 1312, described above.

Referring back to step 1308, if the processor determines that the ray intersects with a transparent object boundary, then at step 1322, the processor accumulates lighting information corresponding to the transparent object at the boundary with the occlusion value to generate an updated occlusion value. Accumulating the lighting information may comprise multiplying a value corresponding to the lighting information with the (current) occlusion value to produce an updated occlusion value.

At step 1324, the processor determines a reflection or refraction angle based on the angle of the incident ray, the surface orientation, a refractive index of the medium before the boundary (e.g., air), and a refractive index of the medium after the boundary.

At step 1326, the processor performs ray tracing by launching a new ray in the direction of the reflection or refraction angle. The method then returns to step 1308, described above, where the processor determines what, if any, objects are intersected by the new ray. In this manner, ray tracing is performed recursively at each intersection with a transparent object, where lighting information is accumulated for each transparent object that is intersected by the ray tracing. In some embodiments, lighting information accumulation is based on the distance a ray travels within a colored transparent medium. The recursive process terminates for the pixel location when the ray either intersects an opaque object or exits the scene.

In some embodiments, to generate soft shadows from larger light sources (e.g., area light sources), the method in FIG. 13 can be repeated by launching a plurality of rays for a given pixel location, as described in FIG. 10.

If, at step 1318, the processor determines that no more pixels in screen space are left to be processed, the method proceeds to step 1320, where the occlusion values stored in the buffer are applied to an image of the scene to add shadows to the scene. Since the occlusion values stored in the buffer include colored shadow information causes by light casting shadows after passing through one or more transparent objects, ray-traced colored shadows are rendered.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for rendering shadows in a scene, the method comprising:
    selecting, by one or more processors, a pixel in an image of a scene, wherein the pixel corresponds to a point on a first object that is visible to a camera capturing the image of the scene;
    initializing, by the one or more processors, an occlusion value for the pixel;
    performing, by the one or more processors, ray tracing by launching a plurality of rays from the point on the first object corresponding to the pixel, wherein rays in the plurality of rays are launched in different directions within a range of a direction from the point on the first object corresponding to the pixel and a light source, wherein the range is based on a size of the light source;
    for each ray in the plurality of rays, determining, by the one or more processors, whether the ray intersects another object in the scene;
    generating, by the one or more processors, an updated occlusion value based on accumulating lighting information for transparent objects intersected by one or more rays of the plurality of rays; and
    storing, by the one or more processors, the updated occlusion value in a buffer at a location corresponding to the pixel, wherein the buffer includes shadow information that is applied to the image of the scene.

2. The method according to claim 1,
    wherein initializing the occlusion value comprises setting the occlusion value to a white color value;
    wherein a first ray in the plurality of rays intersects an opaque object; and
    wherein generating the updated occlusion value comprises setting the occlusion value to a black color value.

3. The method according to claim 1,
    wherein initializing the occlusion value comprises setting the occlusion value to a white color value; and
    wherein the lighting information comprises a color value corresponding to a color of a surface of a second object intersected by a first ray in the plurality of rays, wherein the color value is modulated based on a brightness value corresponding to a transmission coefficient of the second object.

4. The method according to claim 3, wherein generating the updated occlusion value comprises multiplying a numerical value corresponding to the lighting information with a numerical value corresponding to the occlusion value.

5. The method according to claim 1, wherein a first ray in the plurality of rays intersects two or more transparent objects, and wherein generating the updated occlusion value is based on lighting information for each of the two or more transparent objects.

6. The method according to claim 1, wherein a first ray in the plurality of rays intersects a second object, the method further comprising:
    performing ray tracing by launching a second ray from a point of intersection of the first ray with the second object, wherein a direction of the second ray is based on reflection or refraction of the first ray from a surface of the second object;
    determining that the second ray intersects a third object, wherein the third object comprises a transparent object;
    generating a further updated occlusion value based on accumulating lighting information of the third object with the updated occlusion value; and
    storing the further updated occlusion value in the buffer at the location corresponding to the pixel.

7. The method according to claim 6, wherein the direction of the second ray is based on an incident angle of the first ray, a surface orientation of a surface corresponding to the point of intersection of the first ray with the second object, and an index of refraction of the second object.

8. The method according to claim 6, wherein generating the further updated occlusion value is based on a divergence between a direction of the first ray and the direction of the second ray.

9. A non-transitory computer-readable storage medium storing instructions that, when executed by one or more processors, cause a computing device to render shadows in a scene, by performing the steps of:
    selecting a pixel in an image of a scene, wherein the pixel corresponds to a point on a first object that is visible to a camera capturing the image of the scene;
    initializing an occlusion value for the pixel;
    performing ray tracing by launching a plurality of rays from the point on the first object corresponding to the pixel, wherein rays in the plurality of rays are launched in different directions within a range of a direction from the point on the first object corresponding to the pixel and a light source, wherein the range is based on a size of the light source;
    for each ray in the plurality of rays, determining whether the ray intersects another object in the scene;
    generating an updated occlusion value based on accumulating lighting information for transparent objects intersected by one or more rays of the plurality of rays; and
    storing the updated occlusion value in a buffer at a location corresponding to the pixel, wherein the buffer includes shadow information that is applied to the image of the scene.

10. The computer-readable storage medium according to claim 9,
    wherein initializing the occlusion value comprises setting the occlusion value to a white color value;
    wherein a first ray in the plurality of rays intersects an opaque object; and
    wherein generating the updated occlusion value comprises setting the occlusion value to a black color value.

11. The computer-readable storage medium according to claim 9,
    wherein initializing the occlusion value comprises setting the occlusion value to a white color value; and
    wherein the lighting information comprises a color value corresponding to a color of a surface of a second object intersected by a first ray in the plurality of rays, wherein the color value is modulated based on a brightness value corresponding to a transmission coefficient of the second object.

12. The computer-readable storage medium according to claim 11, wherein generating the updated occlusion value comprises multiplying a numerical value corresponding to the lighting information with a numerical value corresponding to the occlusion value.

13. The computer-readable storage medium according to claim 9, wherein a first ray in the plurality of rays intersects two or more transparent objects, and wherein generating the updated occlusion value is based on lighting information for each of the two or more transparent objects.

14. The computer-readable storage medium according to claim 9, wherein a first ray in the plurality of rays intersects a second object, and wherein performing the steps further comprises:
  performing ray tracing by launching a second ray from a point of intersection of the first ray with the second object, wherein a direction of the second ray is based on reflection or refraction of the first ray from a surface of the second object;
  determining that the second ray intersects a third object, wherein the third object comprises a transparent object;
  generating a further updated occlusion value based on accumulating lighting information of the third object with the updated occlusion value; and
  storing the further updated occlusion value in the buffer at the location corresponding to the pixel.

15. The computer-readable storage medium according to claim 14, wherein the direction of the second ray is based on an incident angle of the first ray, a surface orientation of a surface corresponding to the point of intersection of the first ray with the second object, and an index of refraction of the second object.

16. The computer-readable storage medium according to claim 14, wherein generating the further updated occlusion value is based on a divergence between a direction of the first ray and the direction of the second ray.

17. A device for rendering shadows in a scene, the device comprising:
  a memory storing instructions; and
  one or more processors configured to the execute the instructions to cause the device to:
    select a pixel in an image of a scene, wherein the pixel corresponds to a point on a first object that is visible to a camera capturing the image of the scene;
    initialize an occlusion value for the pixel;
    perform ray tracing by launching a plurality of rays from the point on the first object corresponding to the pixel, wherein rays in the plurality of rays are launched in different directions within a range of a direction from the point on the first object corresponding to the pixel and a light source, wherein the range is based on a size of the light source;
    for each ray in the plurality of rays, determine whether the ray intersects another object in the scene;
    generate an updated occlusion value based on accumulating lighting information for transparent objects intersected by one or more rays of the plurality of rays; and
    store the updated occlusion value in a buffer at a location corresponding to the pixel, wherein the buffer includes shadow information that is applied to the image of the scene.

18. The device according to claim 17,
  wherein initializing the occlusion value comprises setting the occlusion value to a white color value;
  wherein a first ray in the plurality of rays intersects a transparent object; and
  wherein the lighting information comprises a color value corresponding to a color of a surface of the second object intersected by the first ray, wherein the color value is modulated based on a brightness value corresponding to a transmission coefficient of the second object.

19. The device according to claim 17, wherein a first ray in the plurality of rays intersects a second object, wherein executing the instructions further causes the device to:
  perform ray tracing by launching a second ray from a point of intersection of the first ray with the second object, wherein a direction of the second ray is based on reflection or refraction of the first ray from a surface of the second object;
  determine that the second ray intersects a third object, wherein the third object comprises a transparent object;
  generate a further updated occlusion value based on accumulating lighting information of the third object with the updated occlusion value; and
  store the further updated occlusion value in the buffer at the location corresponding to the pixel.

20. The device according to claim 19, wherein the direction of the second ray is based on an incident angle of the first ray, a surface orientation of a surface corresponding to the point of intersection of the first ray with the second object, and an index of refraction of the second object.

* * * * *